US012298685B2

(12) United States Patent
Ishio et al.

(10) Patent No.: US 12,298,685 B2
(45) Date of Patent: May 13, 2025

(54) IMAGE FORMING APPARATUS FOR MAINTAINING CLEANING PERFORMANCE WHILE PREVENTING TURN-OVER OF A CONTACT MEMBER

(71) Applicant: CANON KABUSHIKI KAISHA, Tokyo (JP)

(72) Inventors: Shohei Ishio, Tokyo (JP); Keisuke Ishizumi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/486,068

(22) Filed: Oct. 12, 2023

(65) Prior Publication Data

US 2024/0134303 A1 Apr. 25, 2024

(30) Foreign Application Priority Data

Oct. 17, 2022 (JP) ................................. 2022-166025

(51) Int. Cl.
*G03G 15/16* (2006.01)
*G03G 15/00* (2006.01)
*G03G 15/02* (2006.01)
*G03G 21/00* (2006.01)

(52) U.S. Cl.
CPC ....... *G03G 15/162* (2013.01); *G03G 15/0216* (2013.01); *G03G 15/161* (2013.01); *G03G 15/6597* (2013.01); *G03G 21/007* (2013.01); *G03G 2215/066* (2013.01)

(58) Field of Classification Search
CPC ............. G03G 15/0216; G03G 15/161; G03G 15/162; G03G 15/6597; G03G 21/007; G03G 21/12; G03G 2215/066
See application file for complete search history.

(56) References Cited

U.S. PATENT DOCUMENTS

2017/0115608 A1* 4/2017 Ueno .................. G03G 15/161

FOREIGN PATENT DOCUMENTS

| | | | |
|---|---|---|---|
| JP | H07311527 | A | 11/1995 |
| JP | H10260619 | A | 9/1998 |
| JP | H10326067 | A | 12/1998 |
| JP | 2009063993 | A | 3/2009 |
| JP | 2010054853 | A | 3/2010 |
| JP | 2015222302 | A | 12/2015 |
| JP | 2019184960 | A | 10/2019 |
| JP | 2020012992 | A | 1/2020 |

* cited by examiner

*Primary Examiner* — Sophia S Chen
(74) *Attorney, Agent, or Firm* — Canon U.S.A., Inc. IP Division

(57) ABSTRACT

An image forming apparatus includes an image bearing member, an intermediate transfer member, a reinforcing member, and a collection unit having a contact member and a support member. The contact member extends in a longitudinal direction that is orthogonal to an intermediate transfer member movement direction. One end of the contact member is fixed to the support member and the other end is in contact with the intermediate transfer member as a free end. When a maximum region in the longitudinal direction where an image is formable on a transfer medium having a maximum size that is supported by the image forming apparatus is defined as an image forming region, at least part of the reinforcing member is located outside the image forming region and, on one end side of the contact member, the reinforcing member is provided on an inner side than the end of the contact member.

14 Claims, 14 Drawing Sheets

IMAGE FORMING APPARATUS FOR MAINTAINING CLEANING PERFORMANCE WHILE PREVENTING TURN-OVER OF A CONTACT MEMBER

BACKGROUND

Field

The present disclosure relates to an image forming apparatus such as a copying machine or a printer using an electrophotographic printing method.

Description of the Related Art

In an electrophotographic image forming apparatus, a toner image borne by an image bearing member is electrostatically transferred to a transfer medium, such as paper or an OHP sheet, by applying a transfer voltage to a transfer member that is disposed facing the image bearing member, such as a drum-shaped photosensitive member or an intermediate transfer member. In the image forming apparatus, toner (residual transfer toner) remains on the image bearing member after the transfer is completed. Therefore, the residual transfer toner remaining on the image bearing member needs to be removed before image formation corresponding to the next image is performed.

To remove the residual transfer toner, a blade cleaning method is widely used. In the blade cleaning method, the residual transfer toner is scraped off by a cleaning blade serving as a contact member that is in contact with the image bearing member and is collected in a cleaner case.

As the cleaning blade, an elastic body, such as urethane rubber, is widely used. The cleaning blade is often disposed so that an edge portion of the cleaning blade is in pressure contact with the image bearing member in a direction (a counter direction) opposite to the rotation direction (the movement direction) of the image bearing member.

As a structure for collecting the residual transfer toner using a cleaning blade, a structure is widely used in which to sufficiently collect residual transfer toner, the cleaning blade is longer than the width of an opening of the developer container containing toner in the axial direction of the image bearing member. In the structure, toner is virtually absent in a region of the image bearing member corresponding to the outside of the opening in the longitudinal direction. For this reason, the frictional force between the image bearing member and the cleaning blade tends to increase in this region. When the frictional force acting on the edge of the cleaning blade increases, the edge of the cleaning blade disposed facing the image bearing member may be brought into contact with the image bearing member in the forward direction with respect to the rotation direction of the image bearing member (the phenomenon known as "blade turn-over" may occur).

Japanese Patent Laid-Open No. 2009-063993 describes a structure that reduces the occurrence of blade turn-over by using a cleaning blade having high hardness only at both end portions in the longitudinal direction.

SUMMARY

According to an aspect of the present disclosure, an image forming apparatus includes an image bearing member configured to bear a toner image, an intermediate transfer member that is seamless, wherein the intermediate transfer member is in movable contact with the image bearing member, a reinforcing member having a sheet-like shape, and a collection unit configured to collect residual toner on the intermediate transfer member, wherein the collection unit includes a contact member configured to be in contact with the intermediate transfer member to collect the residual toner on the intermediate transfer member and includes a support member configured to support the contact member, wherein the contact member is disposed so as to extend in a longitudinal direction that is orthogonal to a movement direction of the intermediate transfer member, wherein one end of the contact member is fixed to the support member in a transverse direction that is orthogonal to the longitudinal direction, and the other end of the contact member that is in contact with the intermediate transfer member is a free end, wherein the reinforcing member is provided adjacent to an end of the contact member in the longitudinal direction, and wherein, when a maximum region in the longitudinal direction where an image is formable on a transfer medium having a maximum size that is supported by the image forming apparatus is defined as an image forming region, at least part of the reinforcing member is located outside the image forming region and, on one end side of the contact member, the reinforcing member is provided on an inner side than the end of the contact member.

Further features of the present disclosure will become apparent from the following description of exemplary embodiments with reference to the attached drawings.

DESCRIPTION OF THE EMBODIMENTS

First Embodiment

Exemplary embodiments of the present disclosure are described below with reference to the accompanying drawings. The constituent elements in the embodiments described below are very flexible in size, material, shape, and relative positional relationship and should be changed in accordance with the structure and various conditions of the apparatus of the disclosure as appropriate. Accordingly, they are not intended to limit the scope of the disclosure unless specifically stated otherwise.

Overview of Image Forming Apparatus

Figure 1:
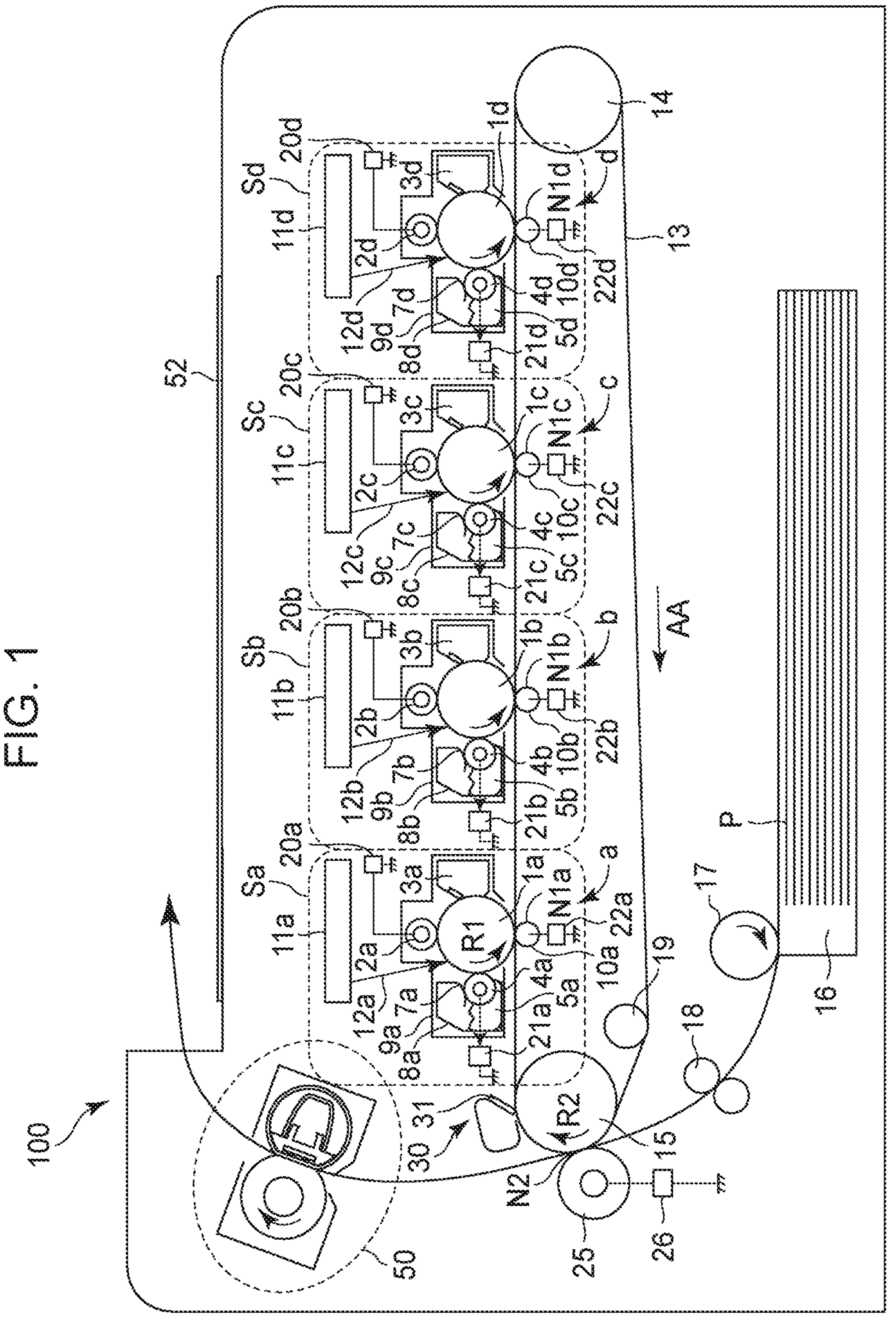
FIG. 1 is a schematic cross-sectional view of an image forming apparatus according to a first embodiment.

FIG. 1 is a schematic cross-sectional view of the structure of an image forming apparatus 100 according to the present embodiment. The image forming apparatus 100 according to the present embodiment is of a so-called tandem type and includes a plurality of image forming units. A first image forming unit Sa forms an image using yellow (Y) toner, a second image forming unit Sb forms an image using magenta (M) toner, a third image forming unit Sc forms an image using cyan (C) toner, and a fourth image forming unit Sd forms an image using black (Bk) toner. The four image forming units are arranged in a row at regular intervals, and most of the structures of the image forming units are substantially the same except for the color of the toner to be stored. Therefore, the image forming apparatus 100 according to the present embodiment is described below with reference to the first image forming unit Sa.

A photosensitive drum 1*a* is formed by stacking a plurality of functional organic material layers on a metal cylinder. Examples of the layers include a carrier generation layer that generates charges by being exposed to light and a charge transport layer that transports the generated charges. The outermost layer has low electrical conductivity and is almost insulating. The photosensitive drum 1*a* receives a driving force from a drive source (not illustrated) and rotates at a predetermined peripheral speed in the direction of arrow R1.

A charging roller 2*a* serving as a charging member is in contact with the photosensitive drum 1*a* and uniformly charges the surface of the photosensitive drum 1*a* while being rotated following the rotation of the photosensitive drum 1*a* in the direction of arrow R1. The charging roller 2*a* is applied with a DC voltage from a charging power source 20*a* and charges the photosensitive drum 1*a* by electric discharge generated in a minute air gap upstream and downstream of a charging section where the charging roller 2*a* and the photosensitive drum 1*a* are in contact with each other.

The developing device 8*a* includes a development roller 4*a* serving as a developing member and a developer blade 7*a* and stores yellow toner. The development roller 4*a* is connected to a developing power source 21*a*. A cleaning unit 3*a* includes a cleaning blade that is in contact with the photosensitive drum 1*a* and a waste toner box that stores toner removed signal. The photosensitive drum 1*a*, the charging roller 2*a*, the cleaning unit 3*a*, and the developing device 8*a* are configured as an integrated process cartridge 9*a* that can be removably attached to the image forming apparatus 100.

The intermediate transfer belt 13 is stretched by three rollers, that is, a secondary transfer facing roller 15 (hereinafter referred to as a facing roller 15), a tension roller 14, and an auxiliary roller 19, which serve as a stretching member. The tension roller 14 is urged by a spring (not illustrated) so that an appropriate tension force is applied to the intermediate transfer belt 13. The facing roller 15 receives a driving force from a drive source (not illustrated) and rotates in the direction of arrow R2 illustrated in FIG. 1, and the intermediate transfer belt 13 moves in the direction of arrow AA illustrated in FIG. 1 as the facing roller 15 rotates. The intermediate transfer belt 13 can move relative to the photosensitive drums 1*a* to 1*d* in the forward direction at substantially the same speed.

The auxiliary roller 19, the tension roller 14, and the facing roller 15 are connected to ground. The facing roller 15 is a roller having an outer diameter of 24.0 mm, which is formed by coating an elastic layer (EPDM rubber) having a thickness of 0.5 mm on an aluminum core metal. Carbon serving as a conductive agent is dispersed in the EPDM rubber so that the EPDM rubber has an electric resistance value of about $1\times10^5\Omega$.

A primary transfer roller 10*a* is provided at a position facing the photosensitive drum 1*a* with the intermediate transfer belt 13 interposed therebetween. The primary transfer roller 10*a* is in contact with the inner peripheral surface of the intermediate transfer belt 13 and is driven to rotate by the movement of the intermediate transfer belt 13. The secondary transfer roller 25 is disposed at a position facing the facing roller 15 with the intermediate transfer belt 13 interposed therebetween and is in contact with the outer peripheral surface of the intermediate transfer belt 13.

The secondary transfer roller 25 is connected to a secondary transfer power source 26.

The image forming operation performed by the image forming apparatus 100 according to the present disclosure is described below. When a control unit (not illustrated), such as a controller, receives an image signal, the image forming operation is started, and the photosensitive drums 1*a* to 1*d*, the facing roller 15, and the like start rotating at a predetermined peripheral speed (a process speed) by a driving force from a drive source (not illustrated). According to the present embodiment, the process speed is 200 mm/s.

The photosensitive drum 1*a* is uniformly charged by the charging roller 2*a* to which a voltage having the same polarity as the normal charging polarity of the toner (negative polarity according to the present embodiment) is applied from the charging power source 20*a*. Thereafter, the scanning beam 12*a* is emitted from the exposure unit 11*a*, and an electrostatic latent image is formed in accordance with image information. The toner stored in the developing device 8*a* is negatively charged by the developer blade 7*a* and is applied to the development roller 4*a*. By applying a predetermined voltage from the developing power source 21*a* to the development roller 4*a*, the electrostatic latent image is developed with toner in a developing section where the development roller 4*a* and the photosensitive drum 1*a* are in contact with each other, and a toner image corresponding to a yellow image component is formed on the photosensitive drum 1*a*.

Thereafter, the yellow toner image borne by the photosensitive drum 1*a* reaches a primary transfer portion N1*a* where the photosensitive drum 1*a* and the intermediate transfer belt 13 are in contact with each other as the photosensitive drum 1*a* rotates.

By applying a voltage of a positive polarity from the primary transfer power source 22*a* to a primary transfer roller 10*a*, the yellow toner image is primarily transferred from the photosensitive drum 1*a* to the intermediate transfer belt 13 in the primary transfer portion N1*a*.

Similarly, the second, third, and fourth image forming units Sb, Sc, and Sd form a magenta toner image of a second color, a cyan toner image of a third color, and a black toner image of a fourth color, respectively. The toner images are sequentially superimposed and primarily transferred onto the intermediate transfer belt 13. As a result, a four-color toner image corresponding to a desired color image is formed on the intermediate transfer belt 13. Thereafter, the four-color toner image borne by the intermediate transfer belt 13 passes through a secondary transfer portion N2 formed by the secondary transfer roller 25 and the intermediate transfer belt 13 in contact with each other and, then, is transferred onto a surface of a transfer medium P, such as paper or an OHP sheet, in a single instance. At this time, a voltage of a positive polarity is applied from the secondary transfer power source 26 to the secondary transfer roller 25 and, thus, the toner image is secondarily transferred from the intermediate transfer belt 13 to the transfer medium P in the secondary transfer portion N2.

The transfer medium P is accommodated in a sheet feeding cassette 16. After being fed from the sheet feeding cassette 16 toward a conveying roller 18 by a feed roller 17, the transfer medium P is conveyed toward the secondary transfer portion N2 by the conveying roller 18. Then, the transfer medium P having the four-color toner image transferred thereonto in the secondary transfer portion N2 is heated and pressurized by a fixing unit 50 and, thus, the four-color toner is melted and mixed and is fixed onto the transfer medium P. Subsequently, the transfer medium P is output from the image forming apparatus 100 and is stacked on an output tray 52 serving as a stacking unit.

The residual transfer toner on the intermediate transfer belt 13 after the secondary transfer is removed from the surface of the intermediate transfer belt 13 by a belt cleaning unit 30 (a collection unit) provided facing the facing roller 15 via the intermediate transfer belt 13. As described in detail below, the belt cleaning unit 30 includes a cleaning blade 31 (a contact member) that is in contact with the outer peripheral surface of the intermediate transfer belt 13 at a position facing the facing roller 15.

In the image forming apparatus 100 according to the present embodiment, a full-color print image is formed through the above-described operations.

The image forming apparatus 100 according to the present embodiment includes a control board (not illustrated) having, thereon, an electric circuit for controlling the operation performed by each of units of the image forming apparatus 100. The control board includes a CPU (not illustrated) serving as a control unit and a memory (not illustrated) serving as a storage unit that stores various control information, and the like. The CPU performs control for conveying the transfer medium P, control for driving the intermediate transfer belt 13 and a process cartridge 9, control for image formation, and control for failure detection.

Intermediate Transfer Belt

Figure 2:
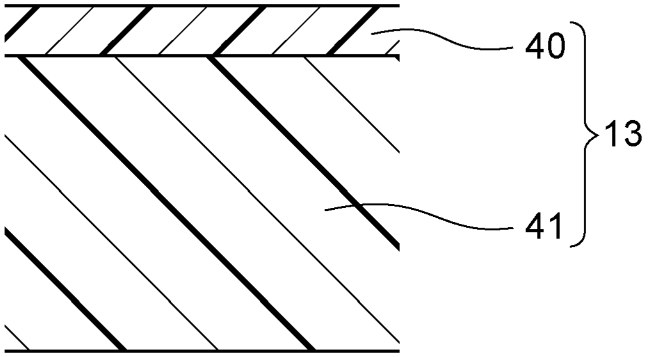
FIG. 2 is a schematic cross-sectional view of an intermediate transfer belt according to the first embodiment.

The structure of the intermediate transfer belt 13 serving as an image bearing member according to the present embodiment is described with reference to FIG. 2. FIG. 2 is a schematic enlarged sectional view of the intermediate transfer belt 13 cut in a direction substantially orthogonal to a belt conveyance direction of the intermediate transfer belt 13 (viewed in the belt conveyance direction). As illustrated in FIG. 2, the intermediate transfer belt 13 is a seamless belt member (or a film-like member) of two layers, that is, a base layer 41 and a surface layer 40 and has a circumferential length of 700 mm.

As used herein, the term "base layer" refers to the thickest layer among the layers constituting the intermediate transfer belt 13 in the thickness direction of the intermediate transfer belt 13. According to the present embodiment, the base layer 41 is a layer having a thickness of 70 μm and made by dispersing quaternary ammonium salt, which is an ion conductive agent serving as an electric resistance adjuster, in polyethylene naphthalate resin. The surface layer 40 is formed on the outer peripheral surface side of the intermediate transfer belt 13 and is a layer made by dispersing antimony-doped zinc oxide serving as an electric resistance adjuster in an acrylic resin serving as a base material. According to the present embodiment, the thickness of the surface layer 40 is set to 3 μm. To improve the surface friction coefficient μ, a solid lubricant, such as polytetrafluoroethylene (PTFE) particles, can be added to the surface layer 40.

Cleaning Unit

Figure 3A:
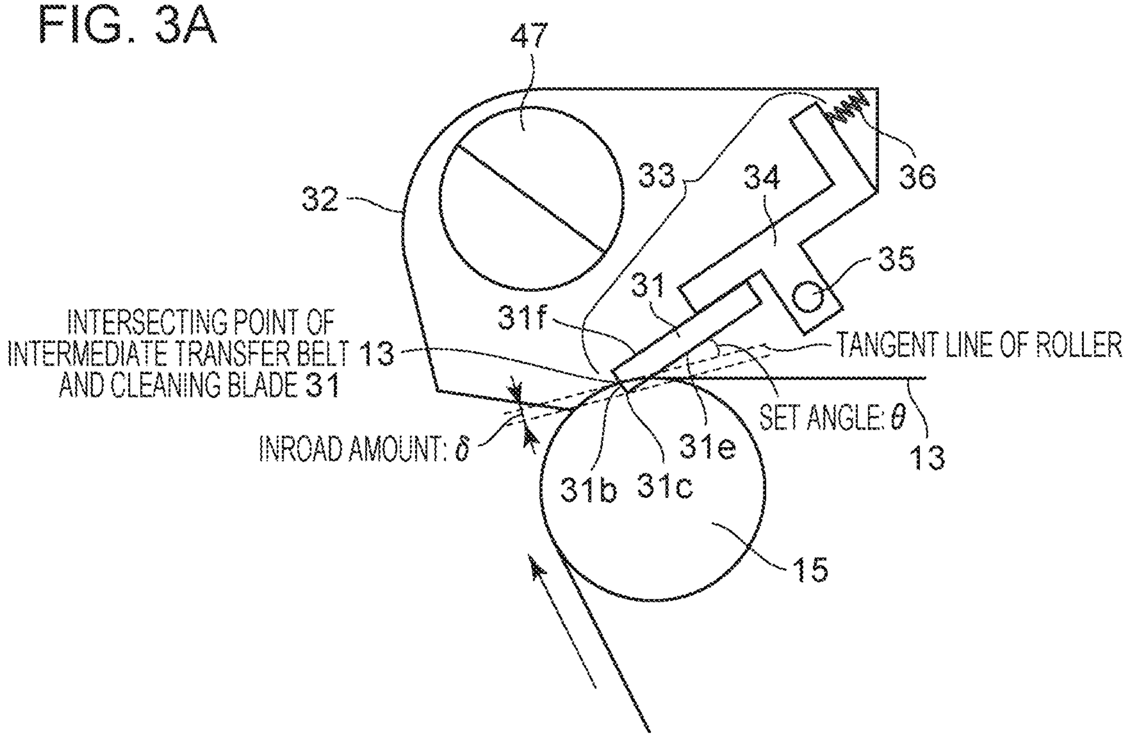
FIGS. 3A and 3B are schematic cross-sectional views of the structure of a belt cleaning unit according to the first embodiment.
Figure 3B:
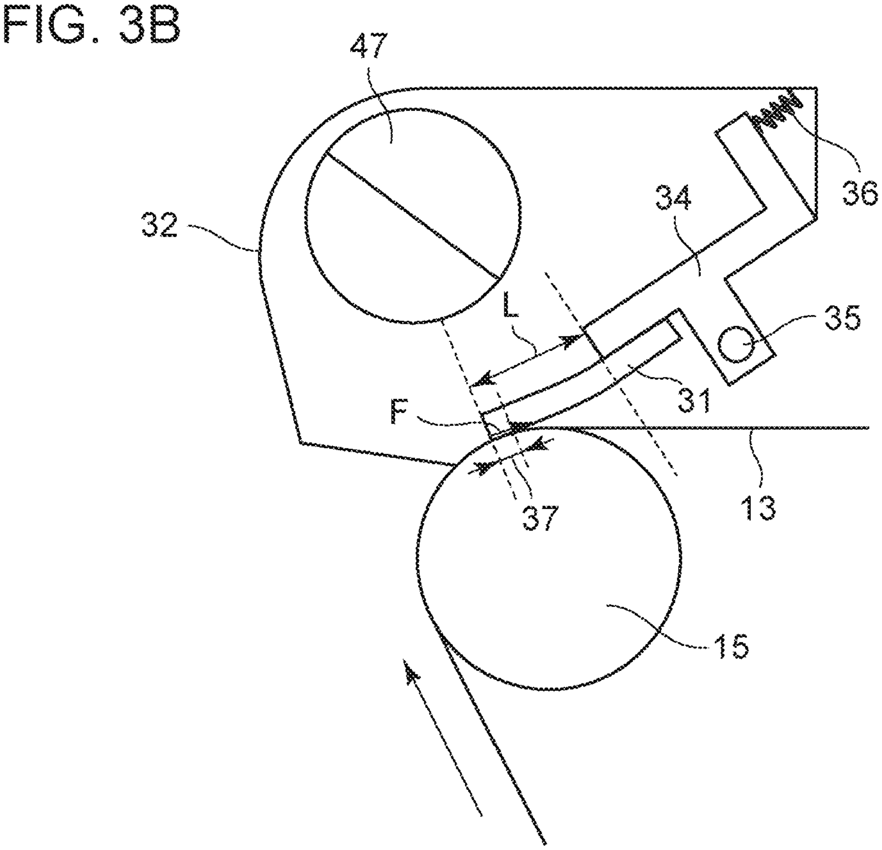
Figure 4:
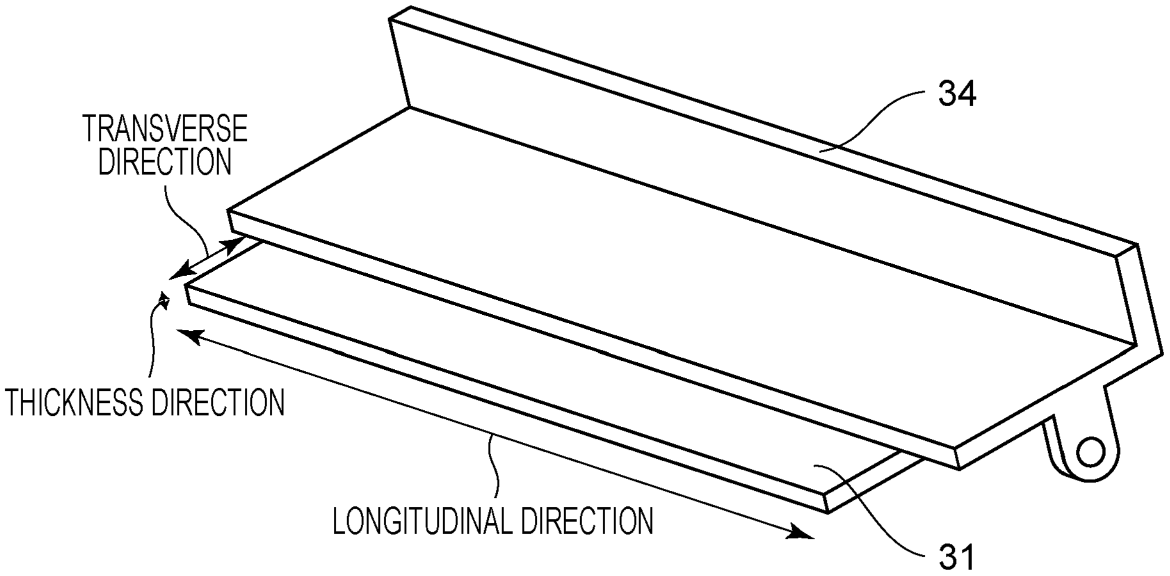
FIG. 4 is a schematic perspective view of the structure of a cleaning blade according to the first embodiment.

The structure of the belt cleaning unit 30 is described below. FIG. 3A is a hypothetical schematic cross-sectional view of the mounting position of the cleaning blade 31 that is not elastically deformed (the cleaning blade 31 is described below). FIG. 3B is a schematic cross-sectional view of the structure of the belt cleaning unit 30 attached to the image forming apparatus 1. FIG. 4 is a schematic perspective view of the structure of the cleaning blade 31.

The belt cleaning unit 30 includes a cleaning container 32 and a cleaning member 33 provided inside of the cleaning container 32. The cleaning container 32 is configured as part of a frame of an intermediate transfer unit (not illustrated) including the intermediate transfer belt 13 and the like. The cleaning member 33 includes a cleaning blade 31 serving as a contact member that is in contact with the intermediate transfer belt 13 and a support member 34 that supports the cleaning blade 31. The cleaning blade 31 is an elastic blade made of urethane rubber (polyurethane) that is an elastic material. The cleaning blade 31 is bonded to the support member 34 formed as a sheet metal made from a galvanized steel sheet and, thus, is supported by the support member 34.

As illustrated in FIGS. 3A to 3B and FIG. 4, the cleaning blade 31 is a plate member that is long in the width direction of the intermediate transfer belt 13 (the longitudinal direction of the cleaning blade 31), which width direction is orthogonal to the movement direction of the intermediate transfer belt 13 (hereinafter referred to as a "belt conveyance direction"). Hereinafter, the directions of the cleaning blade 31, that is, the longitudinal direction, the transverse direction, and the thickness direction are defined as illustrated in FIG. 4. The longitudinal direction is a direction parallel to the width direction of the intermediate transfer belt 13. The transverse direction is a direction orthogonal to the longitudinal direction, and when viewed in the rotational axis direction of the facing roller 15, the transverse direction is a direction that extends from the fixed end (one end) to the free end (the other end) of the cleaning blade 31. The thickness direction is the thickness direction of the cleaning blade 31 and is a direction that intersects (orthogonally) with the longitudinal direction and the transverse direction.

As illustrated in FIG. 3A, the cleaning blade 31 has a fixed end fixedly supported by the support member 34, a free end 31*c* provided on an end opposite to the fixed end in the transverse direction, an end surface 31*b* at the free end, a first surface 31*e*, and a second surface 31*f*. The first surface 31*e* is a surface that extends in the longitudinal direction of the cleaning blade 31 and that faces the outer surface of the intermediate transfer belt 13. The second surface 31*f* is a surface that extends in the longitudinal direction of the cleaning blade 31 and that is opposite to the first surface in the thickness direction. At the free end, the cleaning blade 31 has an end surface that extends in the longitudinal direction and that is orthogonal to the first surface 31*e* and the second surface 31*f*.

As illustrated in FIG. 3B, the cleaning blade 31 is disposed so that the free end (the free end 31*c*) that is not fixedly supported by the support member 34 in the transverse direction that is orthogonal to the longitudinal direction of the cleaning blade 31 is in contact with the intermediate transfer belt 13. Part of the second surface 31*f* of the cleaning blade 31 is bonded and fixed to the support member 34. The length of the cleaning blade 31 in the longitudinal direction is 240 mm, the thickness is 2 mm, and the hardness of the cleaning blade 31 is 77 degrees in JIS K6253.

The cleaning member 33 is configured to be swingable relative to the surface of the intermediate transfer belt 13. That is, the support member 34 is supported to be movable pivotally around a pivot shaft 35 fixed to the cleaning container 32 relative to the surface of the intermediate transfer belt 13. The support member 34 is pressed by a pressurizing spring 36 serving as an urging unit provided in the cleaning container 32, so that the cleaning member 33 rotates about the pivot shaft 35 and, thus, the cleaning blade 31 is urged (pressed) against the intermediate transfer belt 13.

The facing roller 15 is disposed on the inner periphery of the intermediate transfer belt 13 so as to face the cleaning blade 31. The cleaning blade 31 is in contact with the surface of the intermediate transfer belt 13 at a position facing the facing roller 15 while heading in the counter direction to the belt conveyance direction. That is, the cleaning blade 31 is in contact with the surface of the intermediate transfer belt 13 so that the end surface 31*b* at the free end of the cleaning blade 31 in the transverse direction faces upstream in the belt conveyance direction.

As illustrated in FIG. 3B, a blade nip portion 37 is formed between the cleaning blade 31 and the intermediate transfer belt 13. When the blade nip portion 37 is formed, the free end 31*c* of the cleaning blade 31 is in strong contact with the intermediate transfer belt 13 to scrape off residual transfer toner from the surface of the moving intermediate transfer belt 13 and collect the toner into the cleaning container 32.

According to the present embodiment, the mounting position of the cleaning blade 31 is set as follows. As illustrated in FIG. 3A, a set angle θ is 22°, an inroad amount δ is 1.3 mm, and the contact pressure is 0.6 N/cm. Note that the set angle θ is an angle formed by the tangent line of the facing roller 15 and the cleaning blade 31 (more precisely, one surface of the cleaning blade 31 substantially orthogonal to the thickness direction) at an intersecting point of the intermediate transfer belt 13 and the cleaning blade 31 (more precisely, the end surface of the free end of the cleaning blade 31). The inroad amount δ is the length of the cleaning blade 31 overlapping the facing roller 15 in the thickness direction. The contact pressure is defined as the pressing force (the linear pressure in the longitudinal direction) applied by the cleaning blade 31 at the blade nip portion 37 and is measured using a film-type pressure measuring system (PINCH (trade name) available from Nitta Corporation).

In general, urethane rubber and synthetic resin have a large frictional resistance caused by sliding and, thus, the direction of the cleaning blade 31 is likely to follow the rotation direction of the intermediate transfer belt 13 (initial blade turn-over is likely to occur). Therefore, an initial lubricant, such as graphite fluoride, can be applied to the free end 31*c* of the cleaning blade 31 in contact with the intermediate transfer belt 13 in advance. To prevent the cleaning blade 31 from being turned over, it is desirable to apply the initial lubricant to the end surface 31*b* at the free end and at least a 500-μm region of the first surface 31*e* from the free end 31*c*.

The rubber hardness and the contact pressure of the cleaning blade 31 are appropriately selected to ensure the cleaning performance. If the contact pressure is too low, toner cannot be scraped off and slips through the blade nip portion 37, resulting in faulty cleaning. If the contact pressure is too high, the cleaning blade 31 is worn out and, thus, toner slips through the blade nip portion 37, resulting in faulty cleaning. Similarly, if the rubber hardness of the cleaning blade 31 is too high, the toner cannot be scraped off and slips through the blade nip portion 37, resulting in faulty cleaning. If the rubber hardness is too low, the cleaning blade 31 is worn out and, thus, toner slips through the blade nip portion 37, resulting in faulty cleaning. For this reason, the rubber hardness and the contact pressure of the cleaning blade 31 are appropriately selected to ensure the cleaning performance. The rubber hardness of the cleaning blade 31 is to be appropriately selected in accordance with the material of the intermediate transfer belt 13 and the like. However, it is desirable that the rubber hardness be greater than or equal to 70 degrees and less than or equal to 80 degrees in JIS K6253. In addition, it is desirable that the contact pressure of the cleaning blade 31 be greater than or equal to 0.4 N/cm and less than or equal to 0.8 N/cm.

The length in the longitudinal direction of the cleaning blade 31 and the relationship of the length with other members are described below.

According to the present embodiment, the width of the cleaning blade 31 in the longitudinal direction is 240 mm. The width of the cleaning blade 31 is set to be greater than or equal to the width of a toner suppliable region of the intermediate transfer belt 13. In the structure according to the present embodiment, the width of the charging roller 2 (the width of a region that can charge the surface of the photosensitive drum 1*a*) is 230 mm, and the width of a region that the scanning beam 12*a* emitted from the scanner unit of the exposure unit 11*a* can expose is 226 mm. Therefore, by setting the width of the cleaning blade 31 to 230 mm or greater, the cleaning blade 31 can cover the entire toner suppliable region, and the cleaning blade 31 can collect all the toner on the intermediate transfer belt 13.

It is also important not to leak the toner collected by the cleaning blade 31 from the cleaning container 32 to the intermediate transfer belt 13. If the toner leaks, the toner smear on another part may occur, resulting in an image defect or the like. Therefore, in general, a sealing member is provided at end portions of the cleaning blade 31 in the longitudinal direction so as not to form a path through which toner leaks.

Figure 5:
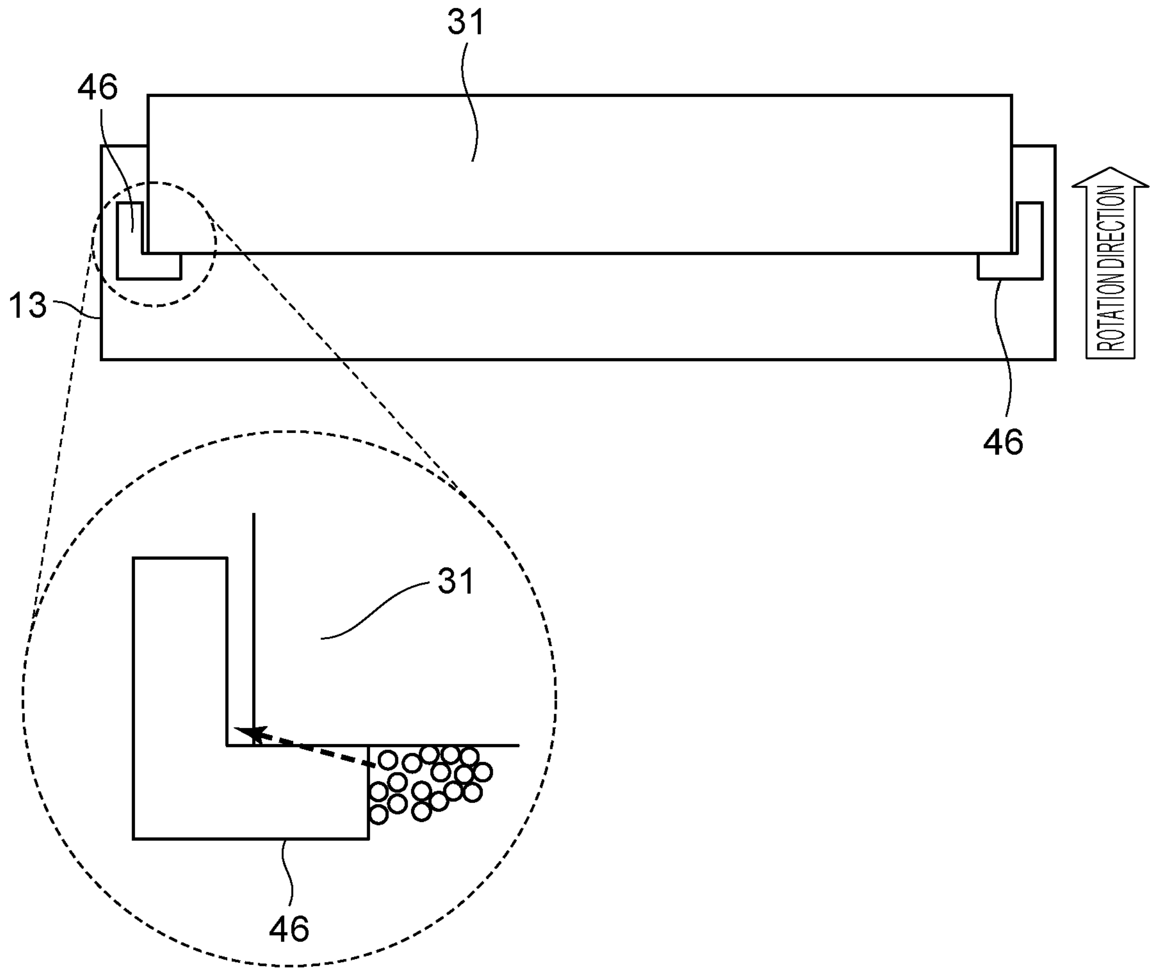
FIG. 5 is a schematic illustration of a sealing member provided at an end of the cleaning blade according to the first embodiment.

FIG. 5 is a schematic illustration of an end seal 46 serving as the sealing member provided at the end of the cleaning blade 31 according to the present embodiment. As illustrated in FIG. 5, in the structure according to the present embodiment, the end seals 46 are provided at either end of the cleaning blade 31 in the longitudinal direction. The end seal 46 is disposed in contact with the end of the cleaning blade 31. By arranging the members so as not to form a gap between the cleaning blade 31 and the end seal 46 in this manner, it is possible to prevent the toner collected by the cleaning blade 31 from leaking from the cleaning container 32 onto the intermediate transfer belt 13.

The toner collected by the cleaning blade 31 is conveyed as waste toner to a waste toner storage portion. According to the present embodiment, the toner collected by the cleaning blade 31 is conveyed to the waste toner storage portion located outside the cleaning container 32 by a conveying mechanism including a screw 47 illustrated in FIGS. 3A and 3B. As a result, the waste toner can be collected until the waste toner storage portion is full, and a sufficient amount of waste toner can be collected even though the image forming apparatus 100 needs long lifetime.

Reinforced Structure of Cleaning Blade

In the structure in which the width of the cleaning blade 31 in the longitudinal direction is longer than the toner suppliable region, the cleaning blade 31 has regions on both side where no toner is supplied or where the amount of supplied toner is small. In a place where the amount of supplied toner is small, a decrease in the friction coefficient μ due to the supply of toner is small and, therefore, a frictional force μN (micronewton) that occurs between the intermediate transfer belt 13 and the cleaning blade 31 increases. When the frictional force μN increases, the force with which the cleaning blade 31 is caught by the intermediate transfer belt 13 increases. As a result, it is highly likely that the cleaning blade 31 moves in the forward direction with respect to the belt conveyance direction, that is, the blade turn-over is highly likely to occur. If blade turn-over occurs, the cleaning performance is degraded, which may cause an image defect due to the faulty cleaning.

In particular, when a pattern with a low image printing ratio (a low print pattern) is continuously formed during image formation, the amount of toner supplied to the cleaning blade 31 is likely to decrease. In addition, under the following image forming conditions, that is, when forming an image in which the image is concentrated in the center of the transfer medium or when small-sized transfer mediums are used continuously, it is likely that less amount of toner is supplied to an end portion of the cleaning blade 31 in the longitudinal direction. As described above, under the image forming conditions in which supplied toner is reduced, the frictional force μN is further increased, and blade turn-over is likely to occur.

Accordingly, to prevent the occurrence of the blade turn-over, it is desirable to employ a structure in which the cleaning blade 31 is reinforced in a region where the amount of supplied toner is small and, thus, deformation of the cleaning blade 31 is less likely to occur. Furthermore, when the friction coefficient μ of the surface of the intermediate transfer belt 13, which is a member facing the cleaning blade 31, is high (for example, when a material having high tackiness with the cleaning blade 31 is used for the surface layer 40), blade turn-over is more likely to occur. Therefore, in a structure in which the surface of the intermediate transfer belt 13 has a high friction coefficient μ, the reinforcing of the cleaning blade 31 is more effective. For example, the structure of the present embodiment in which acrylic resin is used as the material of the surface layer 40 corresponds to a structure in which a tackiness with the urethane rubber of the cleaning blade 31 is high and, thus, the friction coefficient μ of the intermediate transfer belt 13 is high.

Figure 6:
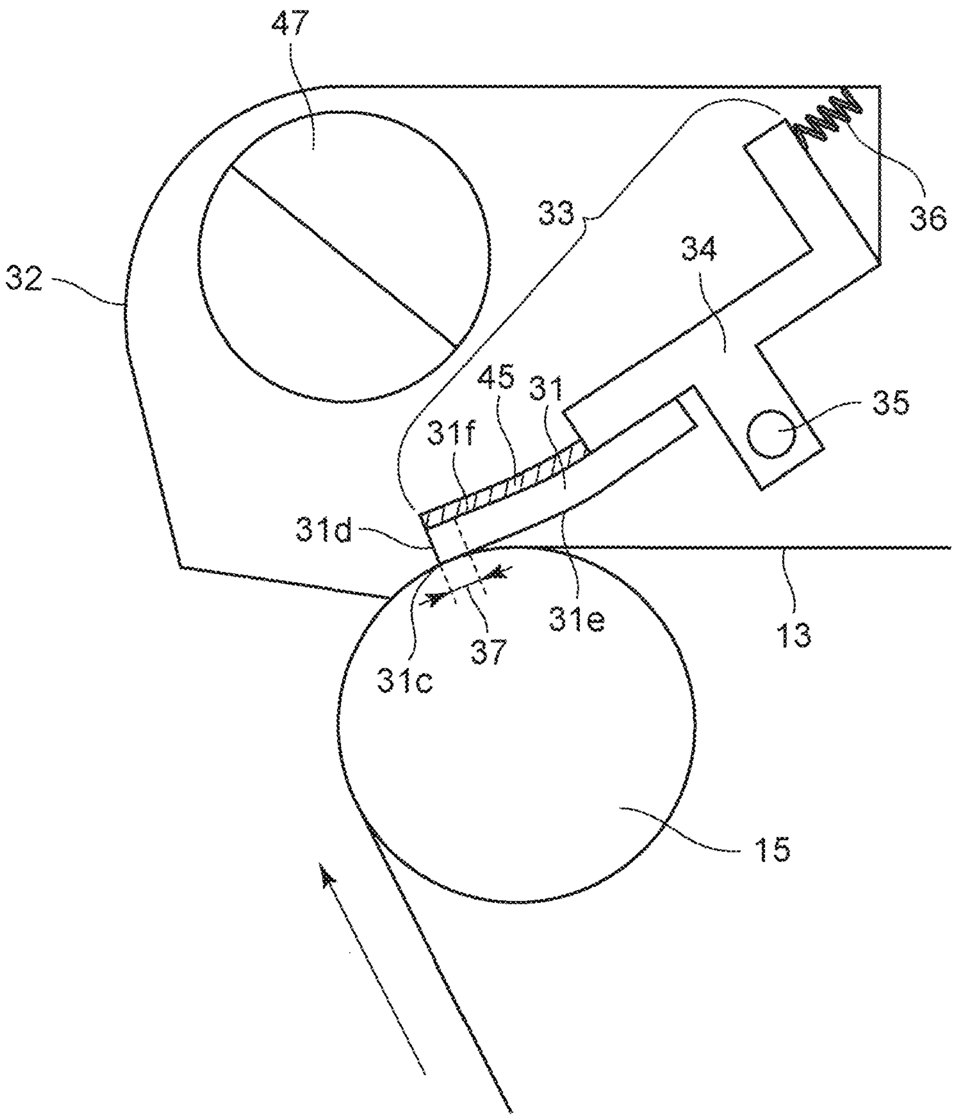
FIG. 6 is a schematic cross-sectional view of the structure of a sheet member according to the first embodiment.

A particular structure for preventing the blade turn-over according to the present embodiment is described below. FIG. 6 is a schematic cross-sectional view of the structure of a sheet member 45 serving as a reinforcing member provided on the cleaning blade 31 according to the present embodiment. As described above, in the structure according to the present embodiment, there are regions outside and inside of an image forming region in the longitudinal direction of the cleaning blade 31 where the frictional force that occurs between the intermediate transfer belt 13 and the cleaning blade 31 are different. As used herein, the term "image forming region" refers to a maximum region where an image can be formed on, among transfer media P supported by the image forming apparatus 100, a transfer medium P having the maximum width in the width direction (the longitudinal direction) orthogonal to the conveyance direction of the transfer medium P. That is, for example, when the maximum size of the transfer medium P that is supported by the image forming apparatus 100 is a letter size, the maximum width that enables an image to be printed on the letter size transfer medium P in the longitudinal direction is the image forming region defined in the present embodiment.

The region inside the image forming region in the longitudinal direction may be supplied with toner remaining after transfer. However, the region outside the image forming region is not supplied with toner and, thus, the friction coefficient μ of the intermediate transfer belt 13 may differ between the inside and the outside of the image forming region. That is, the friction coefficient μ of the intermediate transfer belt 13 outside the image forming region increases and, therefore, the probability of the occurrence of blade turn-over increases.

According to the present embodiment, the cleaning blade 31 is reinforced outside the image forming region to prevent blade turn-over of the cleaning blade 31 at the end portions in the longitudinal direction.

According to the present embodiment, as a reinforcing method, the sheet member 45 is bonded to the cleaning blade 31 as illustrated in FIG. 6. The sheet member 45 is bonded to the second surface 31*f* of the cleaning blade 31 opposite to the first surface 31*e* that faces the intermediate transfer belt 13. More precisely, the sheet member 45 is provided between the end seal 46 and the second surface 31*f* in the thickness direction. According to the structure, the sheet member 45 is provided at a position not facing the toner borne by the intermediate transfer belt 13, that is, at a position facing the inner region of the cleaning container 32. The structure for reinforcing the cleaning blade 31 is described in detail below.

A bonding region of the reinforced cleaning blade 31 to which the sheet member 45 is bonded in the longitudinal direction as illustrated in FIG. 6 is described below. It is effective to reinforce the cleaning blade 31 in the above-described region outside the image forming region where the friction coefficient μ is high. To simultaneously ensure the cleaning performance, it is necessary to ensure the toner sealing performance between the cleaning blade 31 and the end seal 46. To ensure the toner sealing performance, it is effective to prevent wear of the end portion of the cleaning blade.

Figure 7:
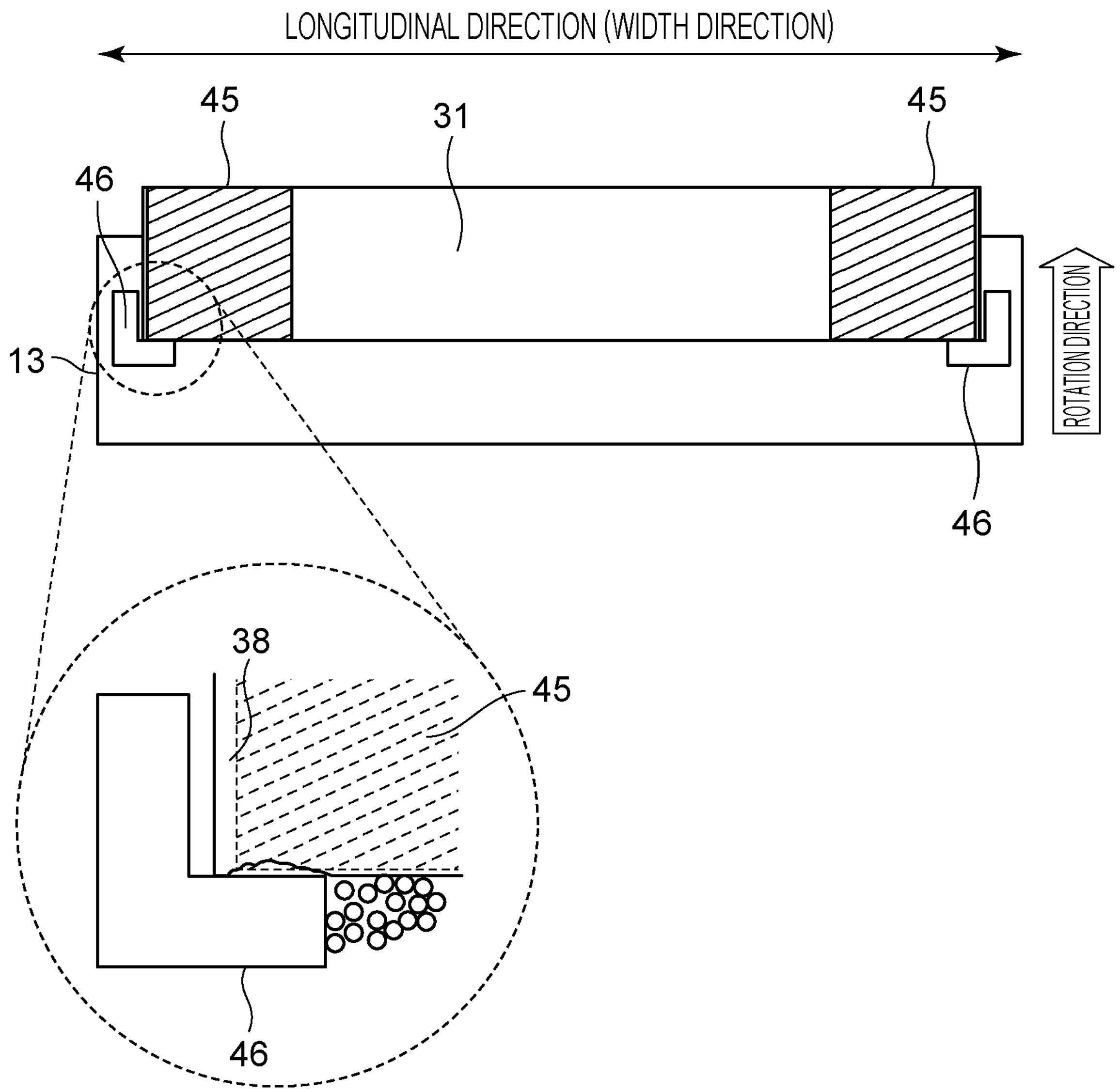
FIG. 7 is a schematic illustration of the structure for reducing wear of an end portion of the cleaning blade in the longitudinal direction according to the first embodiment.
Figure 8:
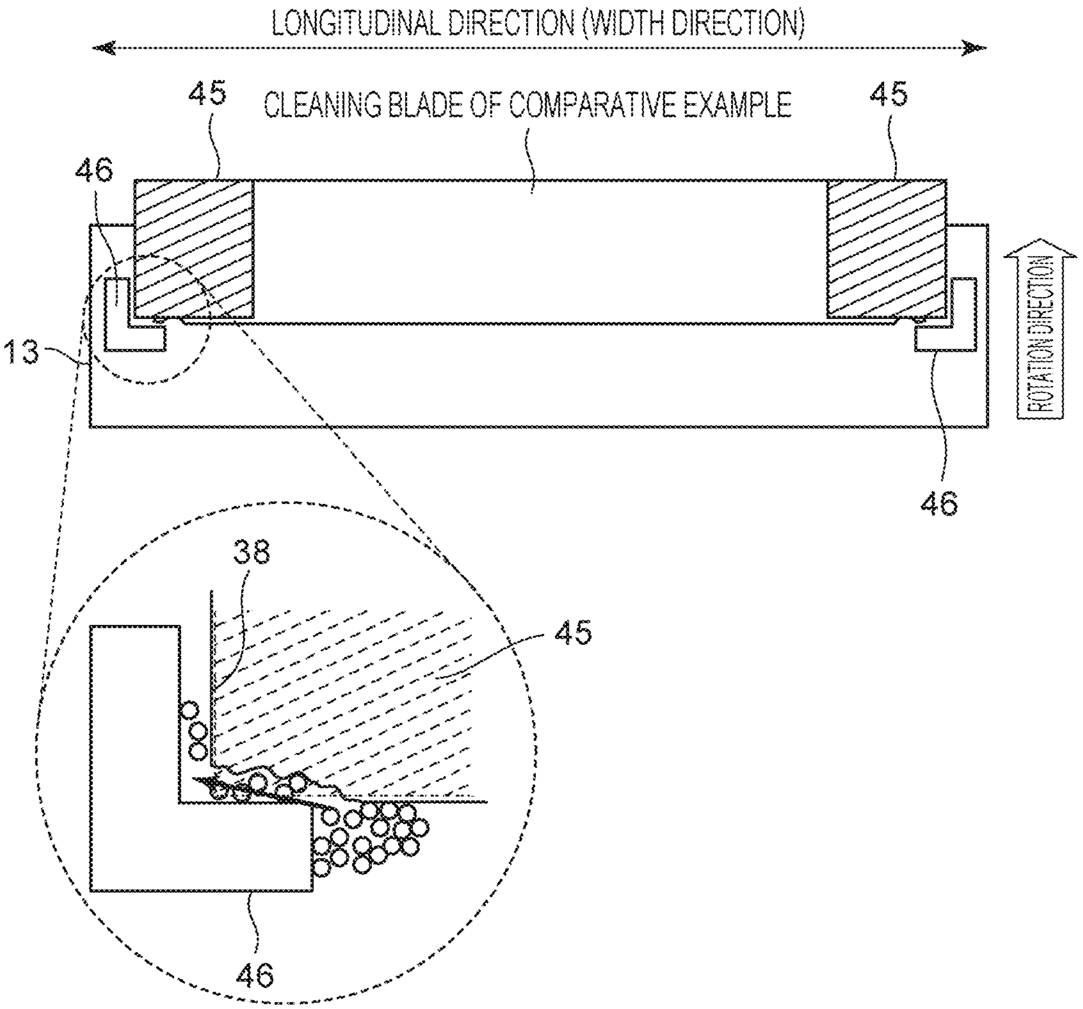
Prior Art FIG. 8
FIG. 8 is a schematic illustration of the end of a cleaning blade where wear occurs in the structure according to a comparative example.

FIG. 7 is a schematic illustration of the structure for preventing wear of the end portion of the cleaning blade 31 in the longitudinal direction. FIG. 8 is a schematic illustration of the end portion of a cleaning blade where wear has occurred in the structure according to a comparative example (the structure according to Comparative Example 2 described below). The structure for preventing wear of the end portion of the cleaning blade 31 is described below with reference to FIGS. 7 and 8.

According to the present embodiment, as illustrated in FIG. 7, an end region 38 to which the sheet member 45 is not bonded is provided in the longitudinal direction of the cleaning blade 31.

As illustrated in the comparative structure illustrated in FIG. 8, the study conducted by the present inventors finds that in the structure in which the sheet member is provided over the entire end portion of the cleaning blade 31, wear of the end portion of the cleaning blade 31 is accelerated. When wear of the cleaning blade is accelerated at the end portion as described above, the toner cannot be trapped between the end seal 46 and the cleaning blade 31 and, thus, toner leaks to the end portion as illustrated in FIG. 8. If the leakage occurs, other members may be contaminated by unexpected toner deposition, which may lead to an adverse effect in an image and performance deterioration.

According to the result of the above-described study, to ensure toner trapping, the end region 38 (an open region) that is not reinforced by the sheet member 45 in the longitudinal direction of the cleaning blade 31 is provided as illustrated in FIG. 7 in the structure of the present embodiment. According to the present embodiment, the length (the width) of the end region 38 in the longitudinal direction is set to 500 μm. To trap toner, it is desirable that the width of the end region 38 in the longitudinal direction be set to 250 μm or greater.

Figure 9:
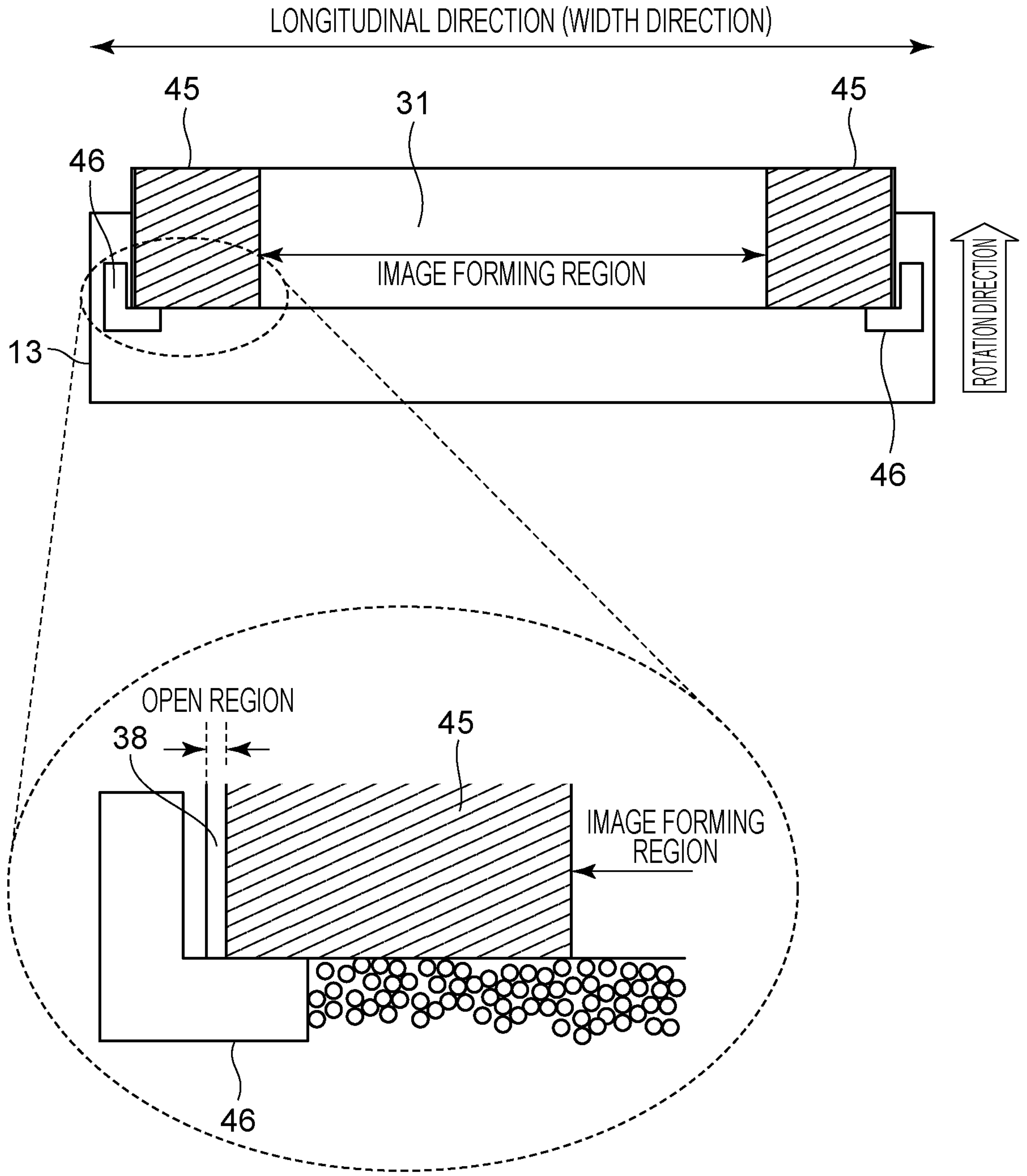
FIG. 9 is a schematic illustration of the location of the sheet member according to the first embodiment.

FIG. 9 is a schematic illustration of the location of the sheet member 45 in the structure according to the present embodiment. As illustrated in FIG. 9, the sheet member 45 is provided in a region that is outside the image forming region (including a boundary of the image forming region) and that excludes the end region 38 in the longitudinal direction of the cleaning blade 31. The reinforced structure using the bonded sheet member 45 in the above-described region of the cleaning blade 31 is described in detail below.

In the structure according to the present embodiment, the elastic modulus of the whole cleaning member 33 including the sheet member 45, the support member 34, and the cleaning blade 31 is improved and, thus, the deformation of the cleaning blade 31 is reduced to reduce the occurrence of blade turn-over. More specifically, the sheet member 45 is bonded to the second surface **31*f* of the cleaning blade 31 to reinforce the cleaning blade 31, so that the elastic modulus of the cleaning member 33 is increased in the portion where the sheet member 45 is bonded in the longitudinal direction. The sheet member 45 may be a biaxially oriented polyester film. Still more specifically, a 100 μm-thick Lumirror® sheet serving as the sheet member 45 is bonded to the cleaning blade 31 with two-sided adhesive tape. The bonding region is illustrated in FIG. 9. In terms of the region in which the sheet member 45 is bonded in the transverse direction, to increase the elastic modulus of the whole cleaning member 33 by using the sheet member 45, it is more desirable to bond the sheet member 45 to the cleaning blade 31 throughout the length of the cleaning blade 31** in the transverse direction.

Figure 10:
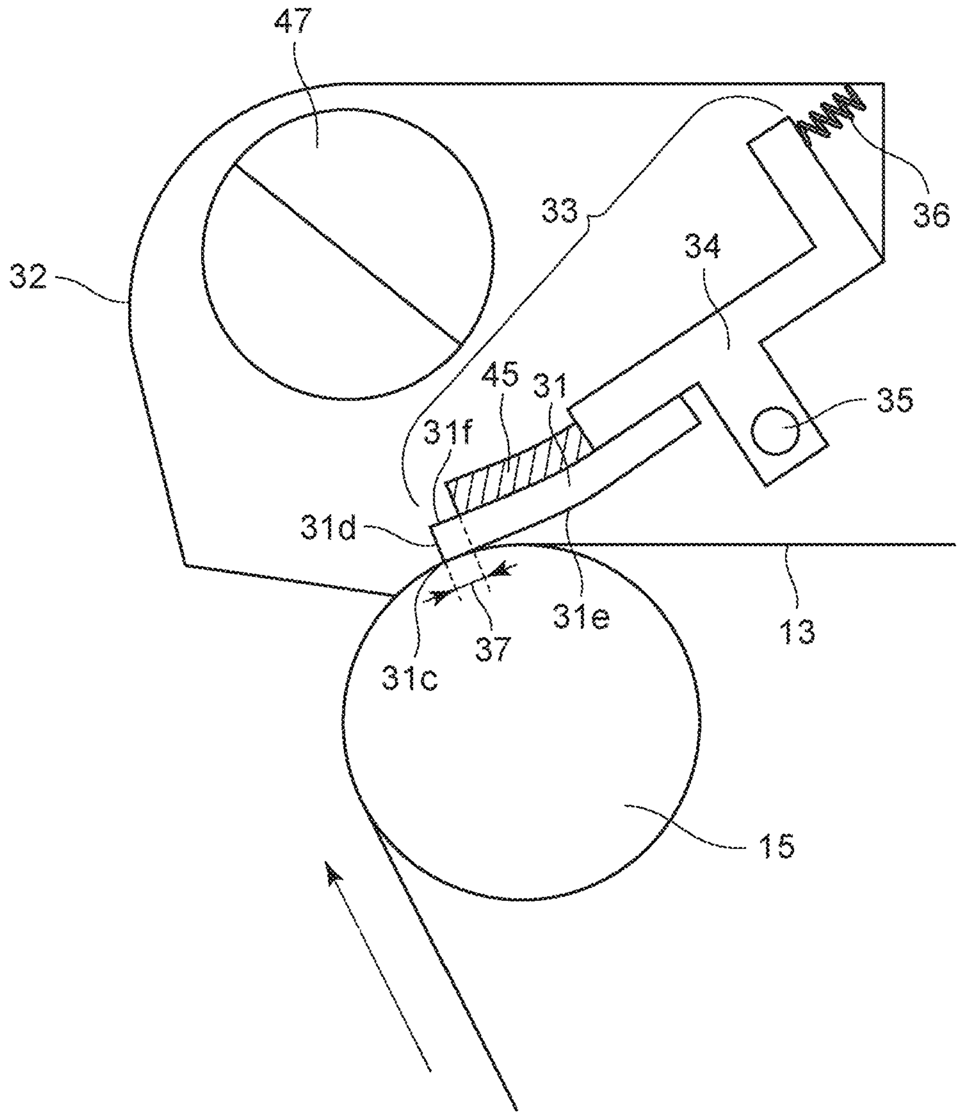
FIG. 10 is a schematic illustration of another example of the first embodiment.

While the description above has been made with reference to the sheet member 45 that is a 100 μm-thick Lumirror® sheet bonded with a two-sided adhesive tape, the structure is not limited thereto. Any structure can be employed if the elastic modulus of the cleaning member 33 is increased by providing the sheet member 45 on the cleaning blade 31. For example, the thickness can be 200 μm instead of 100 μm without any issue. In this case, since the thickness of the sheet member 45 is increased, the elastic modulus of the cleaning member 33 can be increased without bonding the sheet member 45 throughout the length in the transverse direction. For this reason, for example, as illustrated in FIG. 10, instead of bonding the sheet member 45 throughout the length in the transverse direction, the sheet member 45 may be provided with an about 1-mm free region from the free end. In addition, the material of the sheet member 45 is not limited to a Lumirror® sheet. If a sheet member having the elastic modulus that is higher than that of the cleaning blade 31 is used, the elastic modulus of the bonding portion of the cleaning member 33 having the sheet member 45 bonded thereto can be increased in the longitudinal direction. For example, a metal foil composite film is desirable because of its hardness.

In addition, when seeking another desirable structure, it can be determined whether the structure is appropriate from the elastic modulus of the whole cleaning member 33. The elastic modulus of the whole cleaning member 33 is described below. The force received by the cleaning blade 31 of the cleaning member 33 and the amount of deformation of the cleaning blade 31 are discussed below. According to the structure of the present embodiment, the fixed end of the cleaning blade 31 is fixed to the support member 34, and the front end (the free end) of the cleaning blade 31 receives a force acting between the cleaning blade 31 and the intermediate transfer belt 13. For this reason, the force received by the cleaning blade 31 and the amount of deformation of the cleaning blade 31 can be regarded as the strain of a cantilever that has one end fixed and the other end (a free front end) that receives the force. Let F denote a frictional force received by the cleaning blade 31, Δ denote the amount of deformation of the cleaning blade 31, E denote the blade elastic modulus, L denote the free length, and I denote the second moment of area. Then, the amount of deformation Δ of the cleaning blade 31 can be given as follows:

$$\Delta = \frac{FL^3}{3EI}. \tag{1}$$

The second moment of area I is determined by the cross-sectional shape of the deformation point of the cleaning blade 31. For this reason, if the shape deformation in the longitudinal direction does not occur, the second moment of area I is not changed in the longitudinal direction. That is, as can be seen from Equation (1), if the frictional force F increases and the other parameters remain unchanged, the amount of deformation Δ of the cleaning blade 31 increases with increasing frictional force F, resulting in an increase in the occurrence of blade turn-over. Therefore, according to the present embodiment, the elastic modulus E of the blade is increased by providing the sheet member 45. For example, if the combined elastic modulus of the cleaning blade 31 and the sheet member 45 is increased by 1.5 times due to the bonded sheet member 45, the amount of deformation of the reinforcing portion of the cleaning blade 31 can be the same as that of the other portion until the frictional force F is increased by 1.5 times.

A method for measuring the relative elastic modulus after reinforcement is described below. As can be seen from Equation (1) above, when the same force is applied to a region having the same free length and the same width, the amount of deformation Δ and the elastic modulus E are inversely proportional. Therefore, a string is tied to the front end portion of the cleaning blade 31 so that a force is applied to the front end portion of the cleaning blade 31 at which the cleaning blade 31 is in contact with the intermediate transfer belt 13, and a weight is tied to the string. The elastic modulus E of the cleaning member 33 is evaluated using the amount of deformation Δ when the same force is applied.

According to the present embodiment, an end portion of the cleaning blade 31 in the longitudinal direction is reinforced by the sheet member 45 so that the elastic modulus E of the bonding portion having the sheet member 45 bonded thereto is twice the elastic modulus of the central portion.

Effects

The result of comparison of the present embodiment and Comparative Example 1 is described below. In Comparative Example 1, a structure in which the sheet member 45 is not bonded to the cleaning blade is employed. Comparative Example 1 and the present embodiment are evaluated through the measurement of the deformation amount Δ described above. More specifically, the front end of the cleaning blade 31 is pulled so that a force of 100 gf is applied to the front end, and the amount of deformation Δ of the cleaning blade 31 at this time is compared between the present embodiment and Comparative Example 1. Table 1 below indicates the results, and the amount of deformation Δ in Comparative Example 1 is approximately twice that in the first embodiment. As described above, the structure of the present embodiment in which the sheet member 45 is bonded has a smaller amount of deformation Δ of the cleaning blade 31 than that of Comparative Example 1, that is, the cleaning blade 31 is less likely to deform. In the structure according to the present embodiment, the elastic modulus of the cleaning member 33 is improved by the sheet member 45, so that blade turn-over of the cleaning blade 31 can be prevented.

TABLE 1

Deformation Amount Δ Measurement Results of Embodiment and Comparative Example 1

| | Bonding of Sheet Member 45 | Amount of Deformation |
|---|---|---|
| First Embodiment | YES | 0.33 mm |
| Comparative Example 1 | NO | 0.67 mm |

In Comparative Example 2, a structure is employed in which a sheet member is bonded to the entire end portion outside the image forming region in the longitudinal direction of the cleaning blade. The effect of the structure is described below.

If the sheet member is bonded to the end portion throughout the length of the end portion in the longitudinal direction, wear of the end portion of the cleaning blade may be promoted and, thus, a path through which toner leaks may be formed, as described above with reference to FIG. 8. The wear evaluation and the results of the evaluation for the present embodiment and Comparative Example 2 are described below. More specifically, after image formation is performed on 3000 transfer media, wear of the end portion of the cleaning blade is observed, and the wear is evaluated using the depth of wear of the end portion.

To measure the depth of wear, the cleaning blade 31 and the intermediate transfer belt 13 that are in contact with each other are separated, and the end surface 31*b* at the free end 31*c* of the cleaning blade 31 that was in contact with the intermediate transfer belt 13 is observed with a microscope. The microscope used for measurement is a confocal microscope (OPTELICS®, available from Lasertec Corporation). The observation area is 100 μm square per observation, the measurement wavelength is 546 nm, and the scanning frequency in the vertical direction at the contact position of the cleaning blade 31 is 0.1 μm. The maximum value of wear in a region with a width of 500 μm from the end in the longitudinal direction is compared between Comparative Example 2 and the present embodiment.

Table 2 below indicates the results of wear evaluation. As can be seen from Table 2, in Comparative Example 2, the depth of wear at the end is large. In contrast, although wear of the end portion of the cleaning blade 31 occurs even in the present embodiment, the wear does not lead to toner leakage, and the depth of wear is within the allowable range. As described above, according to the study conducted by the present inventors, when the sheet member 45 is provided, the wear of the end portion of the cleaning blade is different between the structure in which in the longitudinal direction, the end region 38 without the sheet member 45 (the open region) is provided and the structure in which the end region 38 is not provided.

TABLE 2

Wear Evaluation Results of Embodiment and Comparative Example 2

| | End Region 38 | Maximum Depth of Wear |
|---|---|---|
| First Embodiment | YES | 0.3 μm |
| Comparative Example 2 | NO | 3.2 μm |

Modifications

The structures according to various modifications of the first embodiment are described below. According to the first embodiment, the structure in which the sheet member 45 is provided outside the image forming region in the longitudinal direction has been described.

Figure 11:
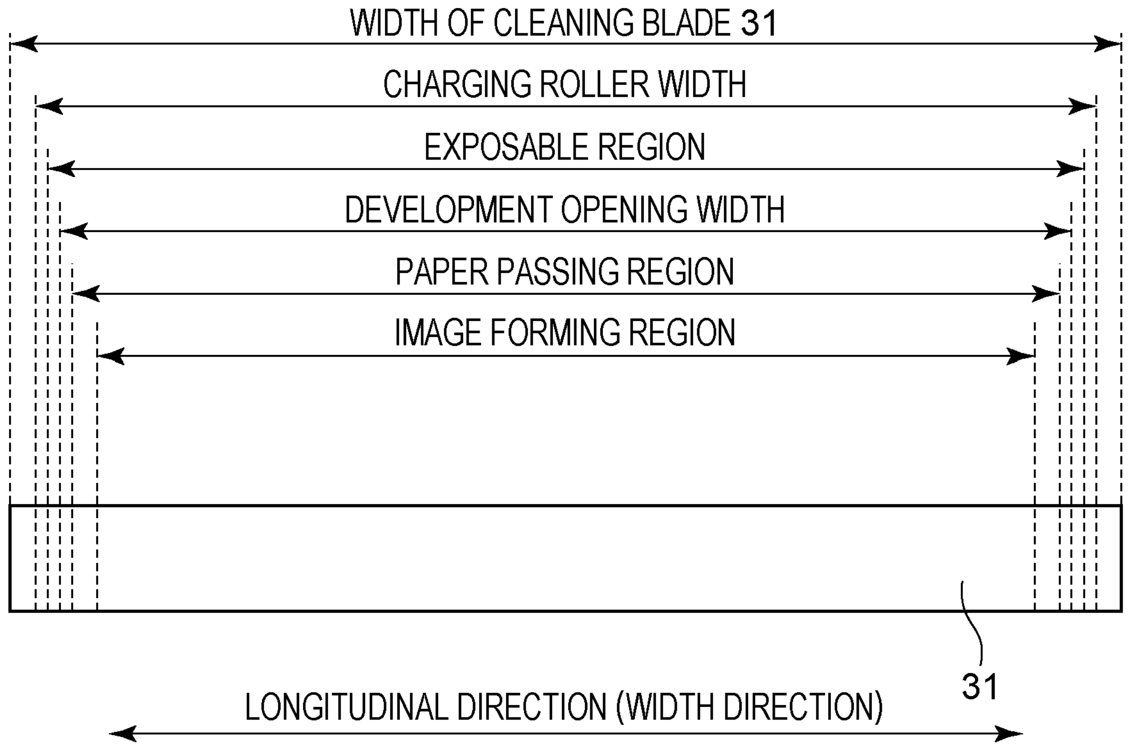
FIG. 11 is a schematic illustration of the width relationship among members in the longitudinal direction.

A plurality of locations of the sheet member 45 outside the image forming region in the longitudinal direction are described with reference to the plurality of modifications. FIG. 11 is a schematic illustration of the widths of the members and regions in the longitudinal direction according to the present embodiment. FIGS. 12A to 12H are schematic illustrations of the structures according to Modifications 1 to 8, respectively.

The frictional forces acting between the cleaning blade 31 and the intermediate transfer belt 13 in the regions corresponding to the widths illustrated in FIG. 11 are first described.

In the image forming region, the toner that is not transferred to the transfer medium P and that remains on the intermediate transfer belt 13 reaches a facing portion of the cleaning blade 31. In contrast, outside the image forming region, there is no supply of residual toner that remains after transfer. As a result, the frictional force between the cleaning blade 31 and the intermediate transfer belt 13 tends to be higher than inside the image forming region.

The definition of the image forming region is as described above. For example, the width of the image forming region based on the letter size in the image forming apparatus 100 according to the present embodiment is 206 mm when the margin is set to a value within 5 mm.

A paper passing region is described below. As used herein, the term "paper passing region" refers to a region through which the transfer medium P can pass in the longitudinal direction, and the length of the region corresponds to the width of the maximum size transfer medium P that the image forming apparatus 100 can support. Paper dust originating from the transfer medium P may reach the facing portion of the cleaning blade 31 in the paper passing region. Supply of the paper dust and rubbing of the transfer medium P against the intermediate transfer belt 13 roughen the surface of the intermediate transfer belt 13. As a result, the frictional force between the intermediate transfer belt 13 and the cleaning blade 31 in the paper passing region tends to decrease.

In contrast, in the region outside the paper passing region, there is no supply of paper dust and no contact between the transfer medium P and the intermediate transfer belt 13 and, therefore, the frictional force between the intermediate transfer belt 13 and the cleaning blade 31 tends to increase as compared with in the paper passing region. Consequently, the structure in which the sheet member 45 is bonded to the region outside of the paper passing region (including the boundary of the paper passing region) is effective for preventing the blade turn-over. The definition of the paper passing region is as described above. For example, the width of the paper passing region based on the letter size in the image forming apparatus 100 according to the present embodiment is 216 mm.

A development opening width is described below. The developer container that stores toner has a development opening, and toner is supplied from the developer container to the development roller 4*a* through the development opening. The development opening is provided so as to have a width greater than that of the developer blade 7*a* in the longitudinal direction. In a region outside of the developer blade 7*a* and inside of the development opening width in the longitudinal direction, toner that is not charged with the normal charging polarity may be present. This is because the toner cannot be charged by the developer blade 7*a*. Since the toner is not charged with the normal charging polarity, the toner may be used for development in a region where toner with negative polarity is not used for development. As a result, the toner may be directly supplied to the cleaning blade 31. That is, the toner that is not charged with the normal charging polarity may reach the region of the facing portion of the cleaning blade 31 inside the development opening.

However, in the region outside the development opening width, the probability of toner being supplied is low. Therefore, the frictional force between the cleaning blade 31 and the intermediate transfer belt 13 is likely to increase as compared with in the region inside the development opening width. For this reason, the structure in which the sheet member 45 is bonded to the region outside the development opening width including the boundary of the development opening width is effective for preventing blade turn-over. According to the structure of the image forming apparatus 100 of the present embodiment, the development opening width in the longitudinal direction is 220 mm.

An exposable region illustrated in FIG. 11 is described below. As described above, the exposable region is a region in which the exposure unit 11 can expose the photosensitive drum 1*a*. In view of toner suppliability, the exposable region is set to be wider in the longitudinal direction than the development opening width, which is a toner suppliable width. According to the present embodiment, the width in the longitudinal direction of the exposure region involved in image formation is 226 mm.

Inside the exposable region, the potential of the photosensitive drum 1*a* varies due to exposure, and electric discharge may occur between the photosensitive drum 1*a* and the intermediate transfer belt 13. Due to the influence of the electric discharge, corona products may be generated on the surface of the photosensitive drum 1*a* and may be deposited on the intermediate transfer belt 13. Alternatively, the electric discharge may damage the surface of the intermediate transfer belt 13. As a result, the friction coefficient μ of the intermediate transfer belt 13 may be increased and, thus, the frictional force between the intermediate transfer belt 13 and the cleaning blade 31 tends to be higher inside the exposable region than in a region outside the exposable region. However, the influence of electric discharge is less apparent in the region outside the exposable region than in the exposable region in the longitudinal direction. Consequently, the structure in which the sheet member 45 is bonded to the cleaning blade 31 in the region corresponding to the inside of the exposable region including the boundary of the exposable region in the longitudinal direction is effective for preventing blade turn-over.

In FIG. 11, the charging roller width is the width in the longitudinal direction of a roller portion of the charging roller 2 that is in contact with the photosensitive drum 1*a* and corresponding to the width in the longitudinal direction of a region of the photosensitive drum 1*a* that can be charged by the charging roller 2. According to the present embodiment, the charging roller width in the longitudinal direction is 230 mm. The photosensitive drum 1*a* receives electric discharge in a region inside the width of the charging roller in the longitudinal direction. Due to the influence of the electric discharge, corona products may be generated on the surface of the photosensitive drum 1*a* and be deposited to the intermediate transfer belt 13. Alternatively, the electric discharge may damage the surface of the intermediate transfer belt 13. As a result, the friction coefficient μ of the intermediate transfer belt 13 may be increased and, thus, the frictional force between the intermediate transfer belt 13 and the cleaning blade 31 tends to be higher in a region inside the charging roller width than in a region outside the charging roller width. However, the influence of electric discharge is less apparent in the region outside the charging roller width than in the region inside the charging roller width in the longitudinal direction. Consequently, the structure in which the sheet member 45 is bonded to the cleaning blade 31 in the region corresponding to the inside of the charging roller width (that is, the region where the photosensitive drum 1*a* is chargeable) including the boundary of the charging roller width in the longitudinal direction is effective for preventing blade turn-over.

As illustrated in FIG. 11, the frictional force between the intermediate transfer belt 13 and the cleaning blade 31 may vary in accordance with the position in the longitudinal direction due to the influence of various members. Therefore, the occurrence of turn-over of the cleaning blade 31 can be reduced by locating the region to be reinforced with the sheet member 45 at a position in the longitudinal position where the frictional force is appropriate.

In the first embodiment and Modifications 1 to 8 described below, on one end side of the cleaning blade 31, part of the cleaning blade 31 having the sheet member 45 thereon is located from a "first position" to a "second position". According to the present embodiment, a sheet member 45 is disposed in the same manner on the other end side. As used herein, the term "first position" refers to the position of an end (the inner end) of the sheet member 45 adjacent the midpoint of the cleaning blade 31 in the longitudinal direction. The second position is the position of an end (the outer end) of the sheet member 45 adjacent to an end of the cleaning blade 31 in the longitudinal direction. In addition, the second position is a position on the opposite side of the first position from the midpoint of the cleaning blade 31 in the longitudinal direction. At least one of the first position and the second position is different among the structures of the modifications.

Figures 12A, 12B, 12C, 12D, 12E, 12F, 12G, 12H:
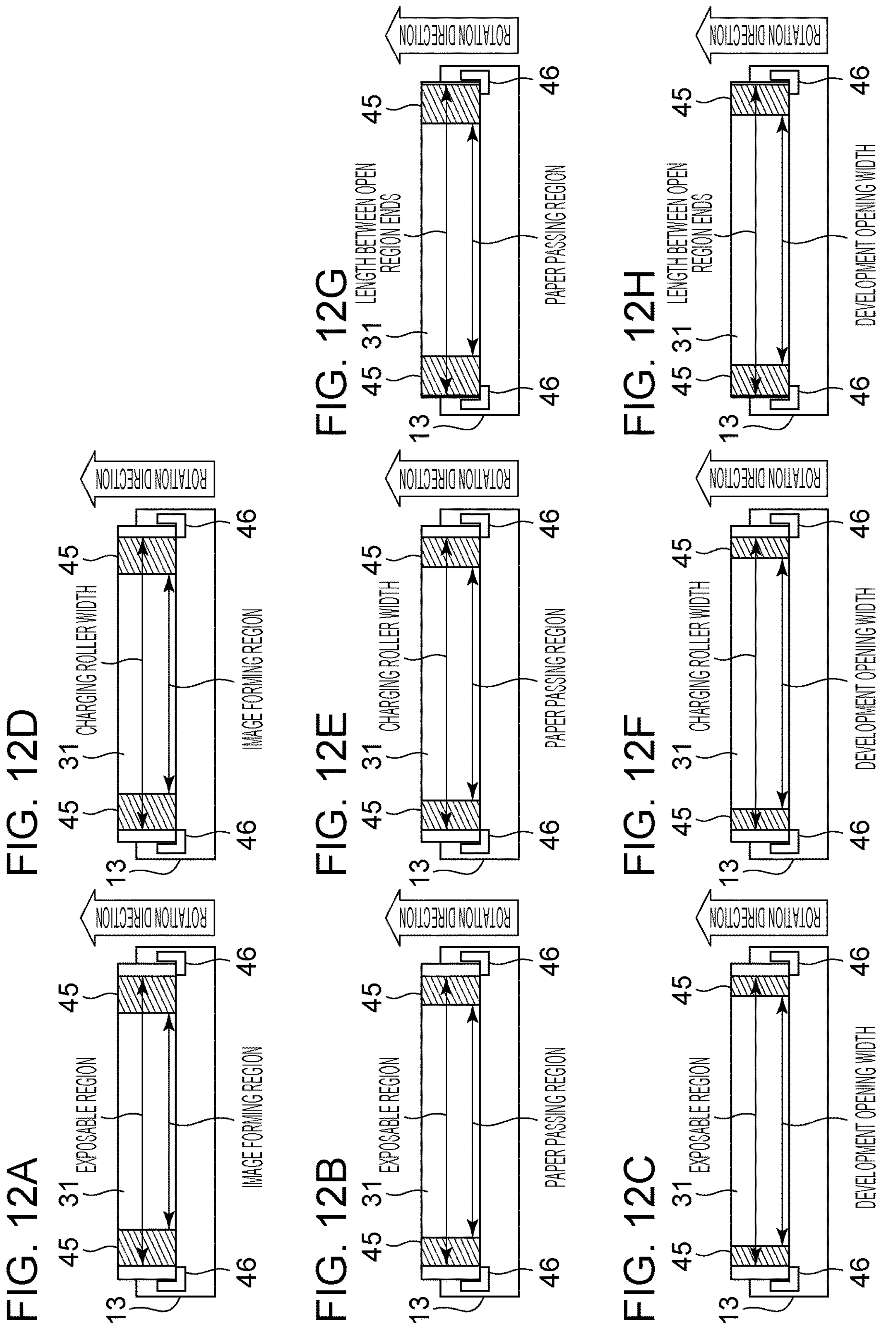
FIGS. 12A to 12H are schematic illustrations of the locations of the sheet member according to Modifications 1 to 8.

FIG. 12A illustrates the structure according to Modification 1. According to Modification 1, the sheet member 45 is provided in a region from a boundary of the image forming region (the first position) to a boundary of the exposable region (the second position) in the longitudinal direction.

FIG. 12B illustrates the structure according to Modification 2. According to Modification 2, the sheet member 45 is provided in a region from a boundary of the paper passing region (the first position) to the boundary of the exposable region (the second position) in the longitudinal direction.

FIG. 12C illustrates the structure according to Modification 3. According to Modification 3, the sheet member 45 is provided in a region from a boundary of the development opening width (the first position) to the boundary of the exposable region (the second position) in the longitudinal direction.

FIG. 12D illustrates the structure according to Modification 4. According to Modification 4, the sheet member 45 is provided in a region from the boundary of the image forming region (the first position) to a boundary of the charging roller width (the second position) in the longitudinal direction.

FIG. 12E illustrates the structure according to Modification 5. According to Modification 5, the sheet member 45 is provided in a region from the boundary of the sheet passing region (the first position) to the boundary of the charging roller width (the second position) in the longitudinal direction.

FIG. 12F illustrates the structure according to Modification 6. According to Modification 6, the sheet member 45 is provided in a region from the boundary of the development opening width (the first position) to the boundary of the charging roller width (the second position) in the longitudinal direction.

FIG. 12G illustrates the structure according to Modification 7. According to Modification 7, the sheet member 45 is provided in a region from the boundary of the paper passing region (the first position) to a boundary of the end region 38 (the open region) (the second position) in the longitudinal direction.

FIG. 12H illustrates the structure according to Modification 8. According to Modification 8, the sheet member 45 is provided in a region from the boundary of the development opening width (the first position) to the boundary of the end region 38 (the open region) (the second position) in the longitudinal direction.

The structures of Modifications 1 to 8 above are summarized in Table 3 below. Note that the first position in the structure of the first embodiment is the boundary (the end) of the image forming region, and the second position is the boundary of the open region.

TABLE 3

| Placement Location of Sheet Member 45 | | | | |
|---|---|---|---|---|
| | | Second Position (Outer Boundary) | | |
| Bonding Position of Sheet Member 45 | | Exposable Region | Charging Roller Width | Open Region |
| First Position (Inner Boundary) | Image Forming Region | modification 1 | modification 4 | first embodiment |
| | Paper Passing Region | modification 2 | modification 5 | modification 7 |
| | Development Opening Width | modification 3 | modification 6 | modification 8 |

Figure 13:
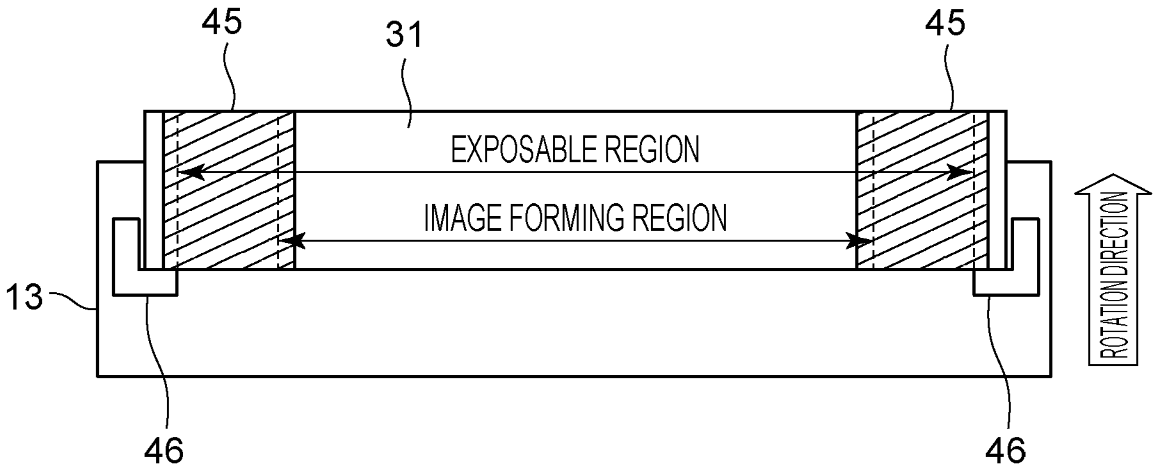
FIG. 13 is a schematic illustration of another structure of the placement location of the sheet member according to Modification 1.
Figure 14:
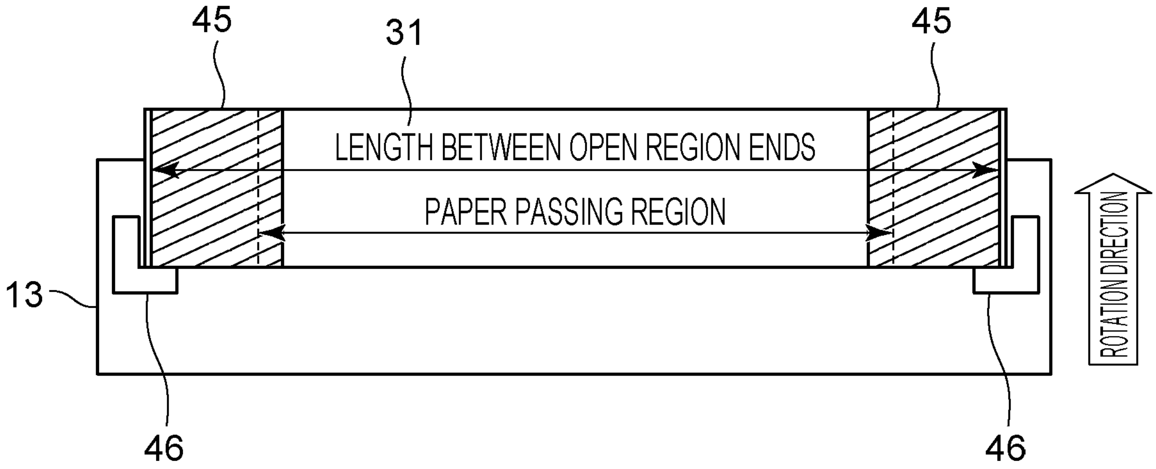
FIG. 14 is a schematic illustration of another structure of placement location of a sheet member according to Modification 7.

FIG. 13 is a schematic illustration of another structure of the bonding position of the sheet member 45 according to Modification 1, and FIG. 14 is a schematic illustration of another structure of the bonding position of the sheet member 45 according to Modification 7.

Although FIGS. 12A to 12H illustrate the structures according to the modifications, the structure is not limited thereto. Any structure in which the sheet member 45 is bonded so as to cover the regions of the members can be employed. That is, FIGS. 12A to 12F illustrate Modifications 1 to 6, respectively, in which the inner boundary is an end of the image forming region, the paper passing region, or the development opening width, and the outer boundary is an end of the exposable region or the charging roller width, and FIGS. 12A to 12F each indicate a region where the sheet member 45 needs to be bonded. Therefore, if the sheet member 45 is bonded so as to cover the regions illustrated in FIGS. 12A to 12F, the effects described in the present embodiment can be obtained. For example, in the case of Modification 1, the actual bonding region of the sheet member 45 may be as illustrated in FIG. 13.

In contrast, in Modifications 7 and 8, the outer boundary reaches the open region. If there is no open region, toner leakage may occur. For this reason, a region from the end of the open region to a certain position inside the open region is a region where the sheet member 45 can be bonded. Therefore, for example, in Modification 7, the sheet member 45 may be bonded as illustrated in FIG. 14. In any of the embodiment and modifications, at least part of the sheet member 45 is located outside the image forming region.

As described above, according to the structures of the present embodiment and Modifications 1 to 8, the sheet member 45 reinforces a region where toner supply is small and, thus, the frictional force is large in the longitudinal direction. Thus, the elastic modulus of the cleaning member 33 can be improved. Furthermore, by providing an open region in which the sheet member 45 is not bonded at an end of the cleaning blade 31, wear of the cleaning blade 31 can be prevented. As a result, an embodiment of an image forming apparatus can be provided that is capable of maintaining the cleaning performance while preventing blade turn-over of the cleaning blade 31.

Second Embodiment

Figure 15:
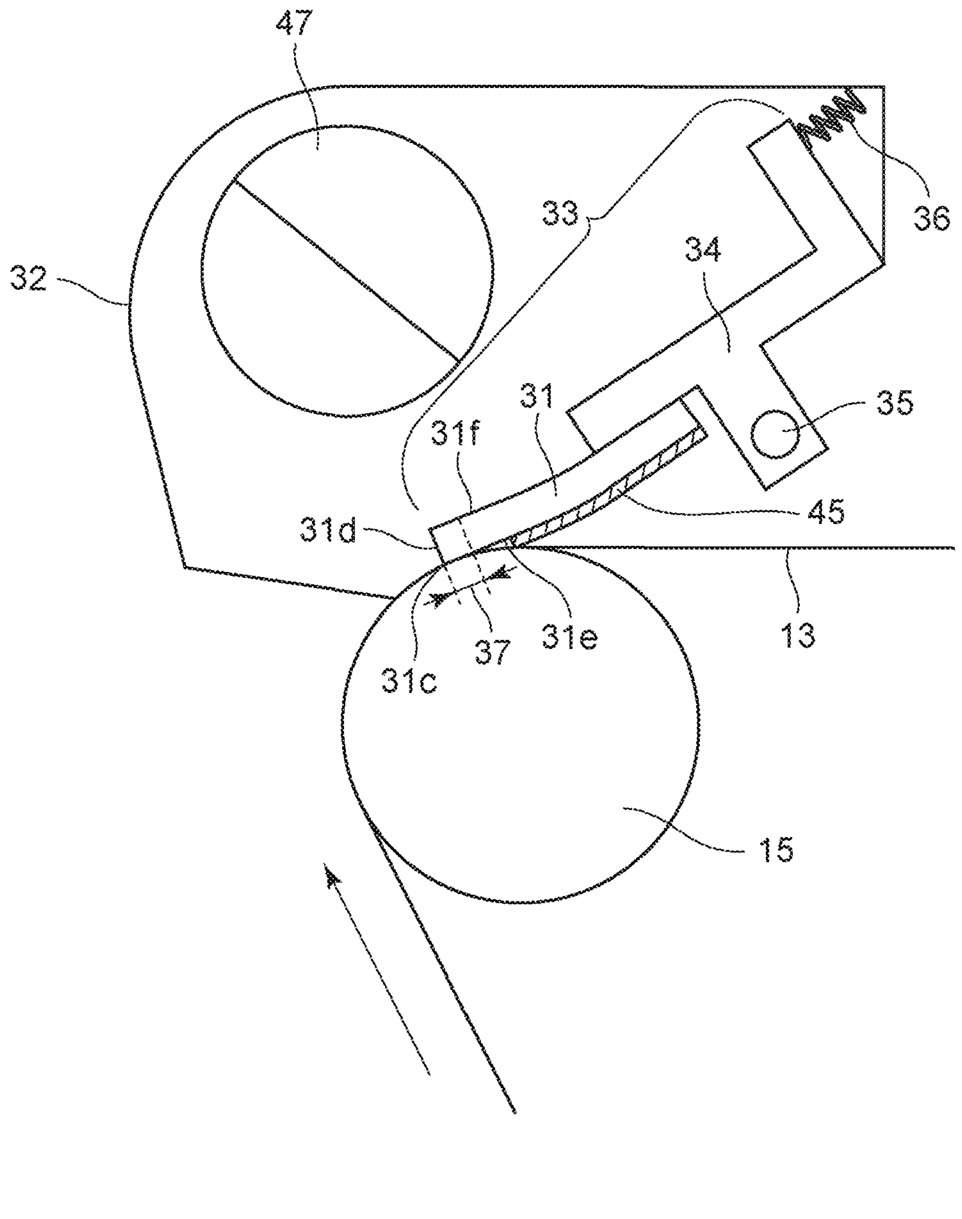
FIG. 15 is a schematic cross-sectional view of the structure of a sheet member according to a second embodiment.

FIG. 15 is a schematic illustration of the structure according to the second embodiment. As illustrated in FIG. 15, unlike the first embodiment, the sheet member 45 according to the second embodiment is bonded to the first surface 31*e* of the cleaning blade 31. Hereinafter, only the structures that differ from those of the first embodiment are described, and the configuration that are the same as those of the first embodiment are identified by the same reference numerals, and a description of the configurations is omitted.

According to the present embodiment, the position where the sheet member 45 is bonded in the longitudinal direction is within the same range as in the first embodiment and, thus a description of the bonding position is omitted. However, unlike the first embodiment, the sheet member 45 is bonded to the first surface opposite to the second surface 31*f*. The first surface 31*e* faces the intermediate transfer belt 13. If the sheet member 45 is brought into contact with the intermediate transfer belt 13, the cleaning performance may be affected. Therefore, according to the present embodiment, to eliminate the affect on the cleaning performance, the sheet member 45 is not provided on the front end portion in the transverse direction of the cleaning blade 31 at the free end.

More precisely, in the structure according to the present embodiment, the length in the transverse direction of the first surface 31*e* of the cleaning blade 31 in contact with the intermediate transfer belt 13 (the length of the blade nip portion 37 in the belt conveyance direction) is 100 μm. In view of the length, to eliminate the affect on the cleaning performance, a length of 100 μm is added to the above-described length (100 μm), and the sheet member 45 is bonded at a position 200 μm away from the free end.

According to the present embodiment, like the first embodiment, the thickness of the sheet member 45 may be greater than or equal to 100 μm. However, if the sheet member 45 is brought into contact with the intermediate transfer belt 13 and, thus, the intermediate transfer belt 13 is under a different condition, the cleaning performance and the frictional force may be affected. For this reason, it is desirable that the thickness and the end position in the transverse direction of the sheet member 45 be controlled so that the sheet member 45 is not brought into contact with the intermediate transfer belt 13.

According to the present embodiment, the contact width of the intermediate transfer belt 13 with the cleaning blade (the width of the blade nip portion 37 in the belt conveyance direction) is set to 100 μm. In the case of this structure, it is desirable that the end position of the sheet member 45 in the transverse direction be at a distance of 200 μm or more from the free end so as not to affect the cleaning performance. The width of the blade nip portion 37 in the belt conveyance direction is not limited to 100 μm and is appropriately determined in accordance with the structures of the intermediate transfer belt 13 and the cleaning blade 31. Therefore, the end position of the sheet member 45 in the transverse direction does not necessarily have to be set at a distance of 200 μm or more from the free end. As described above, the end position of the sheet member 45 may be appropriately set so as not to be brought into contact with the intermediate transfer belt 13.

As described above, according to the present embodiment, like the first embodiment, it is possible to provide a structure that maintains the cleaning performance while reducing the occurrence of blade turn-over of the cleaning blade 31.

According to the embodiments described above, the cleaning blade 31 for the intermediate transfer belt 13 in a color image forming apparatus is reinforced. However, the structure is not limited thereto.

For example, the cleaning blade serving as the cleaning member having the structure according to the present embodiment is employed as a cleaning member for a photosensitive drum of a monochrome image forming apparatus or a cleaning member for a photosensitive drum of a color image forming apparatus. In this case, an image bearing member serving as a facing member that faces the cleaning blade is a rotatable photosensitive drum. Furthermore, the longitudinal direction in the present embodiment is the longitudinal direction of the photosensitive drum, and the longitudinal direction is orthogonal to the rotational axis direction of the photosensitive drum. The other structures including various directions and arrangement of the members are the same as those according to the present embodiment. By employing the structure according to the present embodiment as the structure of a cleaning blade that collects residual toner on a photosensitive drum, the same effects as those described in the present embodiment can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-166025 filed Oct. 17, 2022, which is hereby incorporated by reference herein in its entirety.

What is claimed is:

1. An image forming apparatus comprising:

an image bearing member configured to bear a toner image;

an intermediate transfer member which is a seamless belt, in movable contact with the image bearing member;

a reinforcing member having a sheet-like shape; and a collection unit configured to collect residual toner on the intermediate transfer member, wherein the collection unit includes a contact member configured to be in contact with the intermediate transfer member to collect the residual toner on the intermediate transfer member and includes a support member configured to support the contact member, wherein the contact member is disposed so as to extend in a longitudinal direction that is orthogonal to a movement direction of the intermediate transfer member, wherein one end of the contact member is fixed to the support member in a transverse direction that is orthogonal to the longitudinal direction, and an other end of the contact member in the transverse direction is a free end, the other end being in contact with the intermediate transfer member, wherein the reinforcing member is provided adjacent to one end of the contact member in the longitudinal direction, and wherein, when a maximum region in the longitudinal direction where an image is formable on a transfer medium having a maximum size that is supported by the image forming apparatus is defined as an image forming region, at least part of the reinforcing member is located outside the image forming region in the longitudinal direction and, on the one end side of the contact member in the longitudinal direction, the reinforcing member is provided on an inner side in the longitudinal direction than the one end of the contact member in the longitudinal direction.

2. The image forming apparatus according to claim 1, wherein the reinforcing member is provided between a first position and a second position of the contact member in the longitudinal direction, the first position is a position corresponding to a boundary of the image forming region, and the second position is a position that is located on an opposite side of the first position from a midpoint of the contact member and that is located between the first position and the end of the contact member.

3. The image forming apparatus according to claim 2, further comprising an exposure unit configured to expose a surface of the image bearing member, wherein the second position corresponds to a boundary of a region where the image bearing member is exposable in the exposure unit in the longitudinal direction.

4. The image forming apparatus according to claim 2, further comprising a charging member configured to charge a surface of the image bearing member, wherein the second position corresponds to a boundary of a region where the image bearing member is chargeable by the charging member in the longitudinal direction.

5. The image forming apparatus according to claim 1, wherein, when a width in the longitudinal direction of the transfer medium having the maximum size supported by the image forming apparatus is defined as a paper passing region, the reinforcing member is provided between a first position and a second position of the contact member in the longitudinal direction, and wherein the first position corresponds to a boundary of the paper passing region, and the second position is a position that is located on an opposite side of the first position from a midpoint of the contact member and that is located between the first position and the end of the contact member.

6. The image forming apparatus according to claim 5, further comprising an exposure unit configured to expose a surface of the image bearing member, wherein the second position corresponds to a boundary of a region where the image bearing member is exposable in the exposure unit in the longitudinal direction.

7. The image forming apparatus according to claim 5, further comprising a charging member configured to charge a surface of the image bearing member, wherein the second position corresponds to a boundary of a region where the image bearing member is chargeable by the charging member in the longitudinal direction.

8. The image forming apparatus according to claim 1, further comprising a developing device where the developing device includes a developer container configured to store toner and includes a developing member configured to develop an electrostatic latent image formed on the image bearing member with the toner, wherein the developing device is capable of supplying the toner through an opening provided in the developer container, and wherein the reinforcing member is provided between a first position and a second position of the contact member in the longitudinal direction, the first position corresponds to an end portion of the opening, the second position is a position that is located on an opposite side of the first position from a midpoint of the contact member and that is located between the first position and the end of the contact member.

9. The image forming apparatus according to claim 8, further comprising an exposure unit configured to expose a surface of the image bearing member, wherein the second position corresponds to a boundary of a region where the image bearing member is exposable in the exposure unit in the longitudinal direction.

10. The image forming apparatus according to claim 8, further comprising a charging member configured to charge a surface of the image bearing member, wherein the second position corresponds to a boundary of a region where the image bearing member is chargeable by the charging member in the longitudinal direction.

11. The image forming apparatus according to claim 1, wherein the contact member has a first surface that faces an outer peripheral surface of the intermediate transfer member and a second surface opposite to the first surface, and wherein the reinforcing member is bonded to the second surface.

12. The image forming apparatus according to claim 1, wherein a length of the reinforcing member is less than a length of the contact member in the transverse direction.

13. The image forming apparatus according to claim 12, wherein the contact member has a first surface that faces an outer peripheral surface of the intermediate transfer member and a second surface opposite to the first surface, and wherein the reinforcing member is bonded to the first surface.

14. An image forming apparatus comprising:

an image bearing member that is rotatable and is configured to bear a toner image;

a reinforcing member having a sheet-like shape; and a collection unit configured to collect residual toner on the image bearing member, wherein the collection unit includes a contact member configured to be in contact with the image bearing member to collect the residual toner on the image bearing member and includes a support member configured to support the contact member, wherein the contact member is disposed so as to extend in a longitudinal direction that is orthogonal to a rotational axis direction of the image bearing member, wherein one end of the contact member is fixed to the support member in a transverse direction that is orthogonal to the longitudinal direction, and an other end of the contact member in the transverse direction is a free end, the other end being in contact with the image bearing member, wherein the reinforcing member is provided adjacent to one end of the contact member in the longitudinal direction, and wherein, when a maximum region in the longitudinal direction where an image is formable on a transfer medium having a maximum size that is supported by the image forming apparatus is defined as an image forming region, at least part of the reinforcing member is located outside the image forming region in the longitudinal direction and, on the one end side of the contact member in the longitudinal direction, the reinforcing member is provided on an inner side in the longitudinal direction than the end of the contact member in the longitudinal direction.

* * * * *